United States Patent
Li et al.

(10) Patent No.: US 11,366,340 B2
(45) Date of Patent: Jun. 21, 2022

(54) LIQUID CRYSTAL CELL, METHOD OF DRIVING LIQUID CRYSTAL CELL, AND LIQUID-CRYSTAL-BASED SPECTACLE LENS

(71) Applicant: BOE TECHNOLOGY GROUP CO., LTD., Beijing (CN)

(72) Inventors: Zhongxiao Li, Beijing (CN); Xiaochuan Chen, Beijing (CN); Wenqing Zhao, Beijing (CN); Weili Zhao, Beijing (CN); Haiyan Wang, Beijing (CN); Chen Yu Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 406 days.

(21) Appl. No.: 16/473,460

(22) PCT Filed: Nov. 19, 2018

(86) PCT No.: PCT/CN2018/116264
§ 371 (c)(1),
(2) Date: Jun. 25, 2019

(87) PCT Pub. No.: WO2019/179147
PCT Pub. Date: Sep. 26, 2019

(65) Prior Publication Data
US 2021/0405394 A1 Dec. 30, 2021

(30) Foreign Application Priority Data
Mar. 19, 2018 (CN) .......................... 201810225362.9

(51) Int. Cl.
*G02C 7/08* (2006.01)
*G02F 1/29* (2006.01)

(52) U.S. Cl.
CPC .............. *G02C 7/083* (2013.01); *G02F 1/294* (2021.01)

(58) Field of Classification Search
CPC ................ G02B 27/01; G02B 27/0101; G02B 27/0149; G02B 27/017; G02B 27/0172;
(Continued)

(56) References Cited

U.S. PATENT DOCUMENTS

| 4,909,626 A | 3/1990 | Purvis et al. |
| 8,243,241 B2 | 8/2012 | Yokoyama |

(Continued)

FOREIGN PATENT DOCUMENTS

| CN | 101057174 A | 10/2007 |
| CN | 101889240 A | 11/2010 |

(Continued)

OTHER PUBLICATIONS

International Search Report and Written Opinion dated Feb. 18, 2019.
(Continued)

*Primary Examiner* — Robert E. Tallman
(74) *Attorney, Agent, or Firm* — Dilworth & Barrese, LLP.; Michael J. Musella, Esq.

(57) ABSTRACT

A liquid crystal cell, a method of driving a liquid crystal cell, and a liquid-crystal-based spectacle lens are provided. The liquid crystal cell includes: a ring-like electrode layer, a liquid crystal layer, and an opposite electrode layer. The second ring-like electrode region is concentric with the first ring-like electrode region and surrounds the first ring-like electrode region; the first ring-like electrode region is configured to drive corresponding liquid crystal molecules in the liquid crystal layer, so as to form a first Fresnel zone plate region in the liquid crystal cell; the second ring-like electrode region is configured to drive corresponding liquid
(Continued)

crystal molecules in the liquid crystal layer, so as to form a second Fresnel zone plate region of the liquid crystal cell; an order of the second Fresnel zone plate region is smaller than an order of the first Fresnel zone plate region.

17 Claims, 9 Drawing Sheets

(58) Field of Classification Search
CPC ............ G02B 27/0176; G02B 27/0179; G02C 5/001; G02C 11/00; G02C 11/10; G02C 11/12; G02C 9/00; G02C 9/02; G02C 9/04

See application file for complete search history.

(56) References Cited

U.S. PATENT DOCUMENTS

| | | | |
|---|---|---|---|
| 9,354,451 B2 | 5/2016 | Jeong et al. | |
| 9,823,483 B2 | 11/2017 | Jeong et al. | |
| 2005/0231677 A1 | 10/2005 | Meredith | |
| 2010/0245743 A1 | 9/2010 | Yokoyama | |
| 2012/0162550 A1* | 6/2012 | Jeong | G02B 5/1876 349/15 |
| 2013/0107174 A1 | 5/2013 | Yun et al. | |
| 2014/0253832 A1 | 9/2014 | Lee et al. | |

FOREIGN PATENT DOCUMENTS

| | | |
|---|---|---|
| CN | 102193202 A | 9/2011 |
| CN | 102566064 A | 7/2012 |
| CN | 106950776 A | 7/2017 |
| CN | 107085316 A | 8/2017 |
| JP | 05100201 A | 4/1993 |
| TW | I476499 B | 3/2015 |
| WO | 2017197533 A1 | 11/2017 |

OTHER PUBLICATIONS

First Office Action issued by the Chinese Patent Office in the corresponding Chinese application No. 201810225362.9 dated Apr. 22, 2020.

Extended European Search Report from European Patent Application No. 18889967.8 dated Dec. 2, 2021.

* cited by examiner

LIQUID CRYSTAL CELL, METHOD OF DRIVING LIQUID CRYSTAL CELL, AND LIQUID-CRYSTAL-BASED SPECTACLE LENS

The application claims priority to Chinese patent application No. 201810225362.9, filed on Mar. 19, 2018, the entire disclosure of which is incorporated herein by reference as part of the present application.

TECHNICAL FIELD

Embodiments of the present disclosure relate to a liquid crystal cell, a method of driving a liquid crystal cell, and a liquid-crystal-based spectacle lens.

BACKGROUND

Liquid crystal devices are widely applied in display field for advantages such as small thickness, light weight, fast response and so on. With the deep development of theoretical researches and the improvement of manufacturing technologies of liquid crystal devices, liquid crystal devices are no longer limited to be implemented as display devices, but also can be implemented as new types of liquid crystal devices such as liquid crystal light valves, liquid crystal spectacles and so on.

SUMMARY

At least one embodiment of the present disclosure provides a liquid crystal cell, which comprises: a ring-like electrode layer, a liquid crystal layer, and an opposite electrode layer. The liquid crystal layer is between the ring-like electrode layer and the opposite electrode layer; the ring-like electrode layer comprises a first ring-like electrode region and a second ring-like electrode region, and the second ring-like electrode region is concentric with the first ring-like electrode region and surrounds the first ring-like electrode region; the first ring-like electrode region is configured to drive corresponding liquid crystal molecules in the liquid crystal layer, so as to form a first Fresnel zone plate region of the liquid crystal cell; the second ring-like electrode region is configured to drive corresponding liquid crystal molecules in the liquid crystal layer, so as to form a second Fresnel zone plate region of the liquid crystal cell; and an order of the second Fresnel zone plate region is smaller than an order of the first Fresnel zone plate region.

For example, the liquid crystal cell provided by at least one embodiment of the present disclosure further comprises a third Fresnel zone plate region. The third Fresnel zone plate region is concentric with the first Fresnel zone plate region and surrounds the first Fresnel zone plate region; the second Fresnel zone plate region surrounds the third Fresnel zone plate region; and an order of the third Fresnel zone plate region is smaller than the order of the first Fresnel zone plate region and is greater than the order of the second Fresnel zone plate region, or an order of the third Fresnel zone plate region is equal to the order of the first Fresnel zone plate region or the order of the second Fresnel zone plate region.

For example, the liquid crystal cell provided by at least one embodiment of the present disclosure further comprises a fourth Fresnel zone plate region. The fourth Fresnel zone plate region is concentric with the third Fresnel zone plate region and surrounds the third Fresnel zone plate region, and the second Fresnel zone plate region surrounds the fourth Fresnel zone plate region; and the order of the third Fresnel zone plate region is equal to the order of the first Fresnel zone plate region, and an order of the fourth Fresnel zone plate region is equal to the order of the second Fresnel zone plate region.

For example, in the liquid crystal cell provided by at least one embodiment of the present disclosure, the ring-like electrode layer comprises a plurality of ring-like electrodes arranged outward from a center of the ring-like electrode layer along a radial direction of the ring-like electrode layer; and an amount of ring-like electrodes in the first ring-like electrode region is greater than an amount of ring-like electrodes in the second ring-like electrode region.

For example, in the liquid crystal cell provided by at least one embodiment of the present disclosure, the plurality of ring-like electrodes comprise a plurality of first ring-like electrodes and a plurality of second ring-like electrodes, and the plurality of first ring-like electrodes and the plurality of second ring-like electrodes are alternately and sequentially arranged outward from the center of the ring-like electrode layer along the radial direction of the ring-like electrode layer.

For example, in the liquid crystal cell provided by at least one embodiment of the present disclosure, the ring-like electrode layer comprises a first electrode layer and a second electrode layer that are insulated from each other, and the second electrode layer is closer to the liquid crystal layer as compared to the first electrode layer; the first electrode layer comprises the plurality of first ring-like electrodes that are sequentially arranged outward from a center of the liquid crystal cell, and the plurality of first ring-like electrodes are concentric and insulated from each other; the second electrode layer comprises the plurality of second ring-like electrodes that are sequentially arranged outward from the center of the liquid crystal cell, and the plurality of second ring-like electrodes are concentric and insulated from each other; and at least part of a projection of each of the first ring-like electrodes on the second electrode layer along a direction perpendicular to the second electrode layer is in a gap between corresponding second ring-like electrodes.

For example, in the liquid crystal cell provided by at least one embodiment of the present disclosure, a gap between adjacent second ring-like electrodes is completely covered by a projection of a corresponding first ring-like electrode on the second electrode layer.

For example, in the liquid crystal cell provided by at least one embodiment of the present disclosure, an edge of the projection of the each of the first ring-like electrodes on the second electrode layer connects with edges of the corresponding second ring-like electrodes.

For example, in the liquid crystal cell provided by at least one embodiment of the present disclosure, the first Fresnel zone plate region is in a circular shape and the second Fresnel zone plate region is in a ring shape; a radius of the first Fresnel zone plate region is greater than a ring width of the second Fresnel zone plate region; and all distances between adjacent second ring-like electrodes in the first Fresnel zone plate region are identical.

For example, the liquid crystal cell provided by at least one embodiment of the present disclosure further comprises a first alignment layer and a second alignment layer. The liquid crystal layer comprises a plurality of liquid crystal molecules; the first alignment layer is at a side of the ring-like electrode layer close to the liquid crystal layer; the second alignment layer is at a side of the opposite electrode layer close to the liquid crystal layer; and the first alignment layer and the second alignment layer are configured to allow an initial orientation of the plurality of liquid crystal molecules to be parallel to the first alignment layer and the second alignment layer.

At least one embodiment of the present disclosure further provides a liquid-crystal-based spectacle lens, and the liquid-crystal-based spectacle lens comprises a first liquid crystal cell and a second liquid crystal cell that are stacked. The first liquid crystal cell and the second liquid crystal cell comprise liquid crystal cells each provided by any embodiment of the present disclosure, and the first liquid crystal cell and the second liquid crystal cell have a same structure; and an orientation direction of the liquid crystal layer in the first liquid crystal cell and an orientation direction of the liquid crystal layer in the second liquid crystal cell are perpendicular to each other in a plane perpendicular to a direction along which the first liquid crystal cell and the second liquid crystal cell are stacked.

At least one embodiment of the present disclosure still provides a method of driving the liquid crystal cell provided by any embodiment of the present disclosure. The method comprises: applying a first group of driving signals to ring-like electrodes in the first ring-like electrode region; and applying a second group of driving signals to ring-like electrodes in the second ring-like electrode region.

For example, in the method provided by at least one embodiment of the present disclosure, the first group of driving signals are configured to drive the corresponding liquid crystal molecules in the liquid crystal layer, so as to form the first Fresnel zone plate region of the liquid crystal cell; the second group of driving signals are configured to drive the corresponding liquid crystal molecules in the liquid crystal layer, so as to form the second Fresnel zone plate region of the liquid crystal cell; and the order of the second Fresnel zone plate region is smaller than the order of the first Fresnel zone plate region.

For example, in the method provided by at least one embodiment of the present disclosure, in a case where the liquid crystal cell further comprises a third Fresnel zone plate region, the third Fresnel zone plate region is concentric with the first Fresnel zone plate region and surrounds the first Fresnel zone plate region, and the second Fresnel zone plate region surrounds the third Fresnel zone plate region, and an order of the third Fresnel zone plate region is smaller than the order of the first Fresnel zone plate region and is greater than the order of the second Fresnel zone plate region, or an order of the third Fresnel zone plate region is equal to the order of the first Fresnel zone plate region or the order of the second Fresnel zone plate region. The method further comprises: applying a third group of driving signals to liquid crystal molecules corresponding to the third Fresnel zone plate region.

For example, in the method provided by at least one embodiment of the present disclosure, in a case where the liquid crystal cell further comprises a fourth Fresnel zone plate region, the fourth Fresnel zone plate region is concentric with the third Fresnel zone plate region and surrounds the third Fresnel zone plate region, and the second Fresnel zone plate region surrounds the fourth Fresnel zone plate region, and the order of the third Fresnel zone plate region is equal to the order of the first Fresnel zone plate region, and an order of the fourth Fresnel zone plate region is equal to the order of the second Fresnel zone plate region. The method further comprises: applying the first group of driving signals to the liquid crystal molecules corresponding to the third Fresnel zone plate region; and applying the second group of driving signals to liquid crystal molecules corresponding to the fourth Fresnel zone plate region.

For example, the method provided by at least one embodiment of the present disclosure further comprises: changing signals that are applied to liquid crystal molecules corresponding to the first Fresnel zone plate region from the first group of driving signals into a fourth group of driving signals, and changing signals that are applied to the liquid crystal molecules corresponding to the third Fresnel zone plate region from the first group of driving signals into a fifth group of driving signals, so as to merge the first Fresnel zone plate region and the third Fresnel zone plate region into a first merged Fresnel zone plate region as a whole; and changing signals that are applied to liquid crystal molecules corresponding to the second Fresnel zone plate region from the second group of driving signals into a sixth group of driving signals, and changing signals that are applied to the liquid crystal molecules corresponding to the fourth Fresnel zone plate region from the second group of driving signals into a seventh group of driving signals, so as to merge the second Fresnel zone plate region and the fourth Fresnel zone plate region into a second merged Fresnel zone plate region as a whole, and an order of the first merged Fresnel zone plate region being greater than an order of the second merged Fresnel zone plate region.

For example, in the method provided by at least one embodiment of the present disclosure, voltages that are applied to the ring-like electrodes in the first Fresnel zone plate region are different from each other; and voltages that are applied to the ring-like electrodes in the second Fresnel zone plate region are different from each other.

For example, in the method provided by at least one embodiment of the present disclosure, the voltages that are applied to the ring-like electrodes in the first Fresnel zone plate region change monotonically along a radial direction of the ring-like electrodes; and the voltages that are applied to the ring-like electrodes in the second Fresnel zone plate region change monotonically along a radial direction of the ring-like electrodes.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventor(s) of the present disclosure notes (note) that current liquid crystal spectacles is usually realized through driving a liquid crystal cell to form a liquid crystal lens or a liquid crystal Fresnel lens. However, the liquid crystal spectacles based on the liquid crystal lens has the disadvantage that the liquid crystal cell has a large thickness, and the liquid crystal spectacles based on the liquid crystal Fresnel lens has the disadvantages such as complex driving method, poor focusing effect, and so on. The above-mentioned problems are described illustratively in the following with reference to FIG. 1A and FIG. 1B.

Figure 1A:
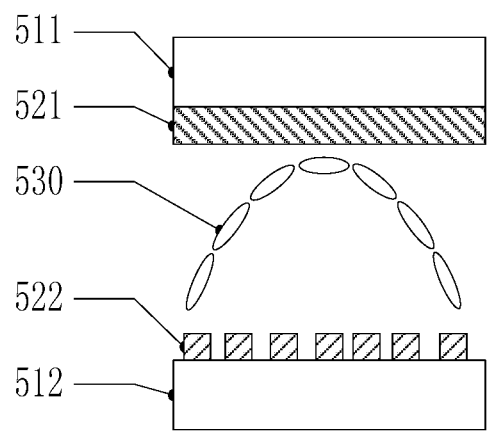
FIG. 1A is an exemplary cross-sectional view of a liquid crystal lens.

FIG. 1A illustrates a liquid crystal cell for forming a liquid crystal lens. As illustrated in FIG. 1A, a liquid crystal cell 500 for forming the liquid crystal lens comprises a first substrate 511 and a second substrate 512 which are opposite to each other, and a liquid crystal layer 530 between the first substrate 511 and the second substrate 512. For example, a planar electrode 521 is provided on the first substrate 511, and for example, stripe-type or ring-like electrodes 522 are provided on the second substrate 512, and at least part of the above-mentioned stripe-type or ring-like electrodes 522 are applied with different voltages, so as to allow liquid crystal molecules in the liquid crystal layer 530 to be driven to rotate and to have different rotation degrees, such that lens units with different diopter can be obtained. Because the refractive index of the liquid crystal material is relatively small, a relatively large thickness is needed to realize the optical path difference distribution same as an ordinary lens (for example, a lens that is made of glass). However, this adversely increases the amount of liquid crystal in the liquid crystal cell, decreases the transmittance and response time of the liquid crystal cell, and increases the driving voltage for the liquid crystal cell.

Figure 1B:
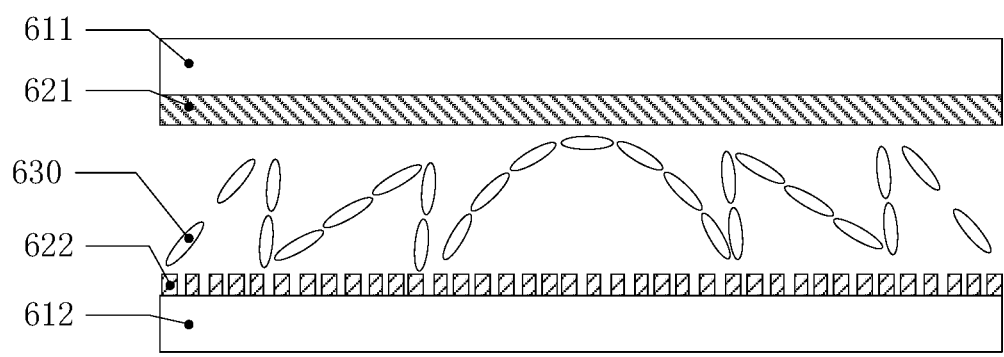
FIG. 1B is an exemplary cross-sectional view of a liquid crystal Fresnel lens.

FIG. 1B illustrates a liquid crystal cell for forming a liquid crystal Fresnel lens. As illustrated in FIG. 1B, a liquid crystal cell 600 for forming the liquid crystal Fresnel lens comprises a first substrate 611 and a second substrate 612 which are opposite to each other, and a liquid crystal layer 630 between the first substrate 611 and a second substrate 612. For example, a planar electrode 621 is provided on the first substrate 611, and for example, stripe-type or ring-like electrodes 622 are provided on the second substrate 612. At least part of the above-mentioned stripe-type or the ring-like electrodes 622 may be applied with different voltages, so as to allow liquid crystal molecules in the liquid crystal layer 630 to be driven to rotate and to have different rotation degrees, such that a liquid crystal Fresnel lens can be obtained. However, in order to form the liquid crystal Fresnel lens in the liquid crystal cell, a complicated driving scheme and/or a complicated electrode structure are/is adopted, so as to cause the rotation degrees of the liquid crystal molecules in partial region of the liquid crystal cell to change sharply (for example, the liquid crystal molecules need to be arranged in a triangle shape). For example, in a case where the rotation degrees of the liquid crystal molecules do not reach pre-determined values, the focusing effect of the liquid crystal cell (i.e., the liquid crystal Fresnel lens) may be deteriorated, and therefore, it is hard to obtain the required liquid crystal spectacles.

The inventor(s) of the present disclosure further notes (note) that a Fresnel zone plate may be formed through driving a liquid crystal cell. Because the Fresnel zone plate may realize a focusing effect based on diffraction principle, the liquid crystal cell may be implemented as liquid crystal spectacles. However, the inventor(s) notes (note) that, current liquid crystal cell has problems such as low transmittance (i.e., low diffraction efficiency), small size (small size of an effective working area that is parallel to the plane of the liquid crystal cell) and/or large focal length (small degree of the spectacles). The above-mentioned problems are described in the following with reference to FIG. 2A and FIG. 2B.

Figure 2A:
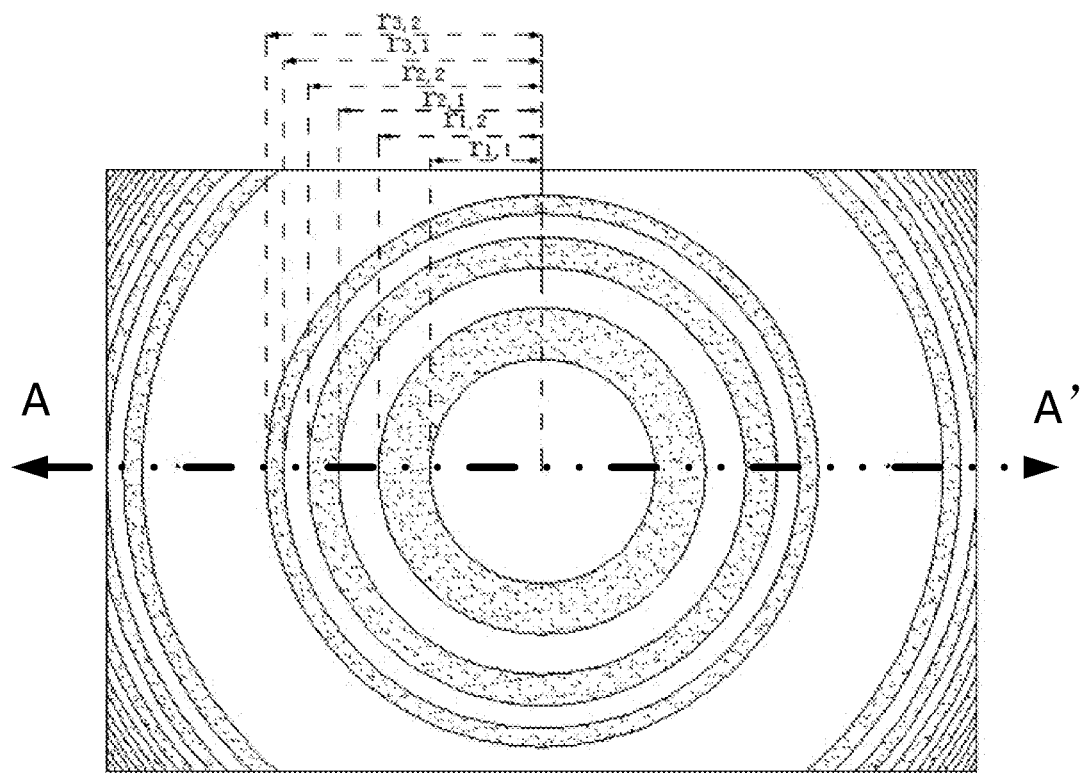
FIG. 2A is a schematic plane diagram of two-step Fresnel zone plate.
Figure 2B:
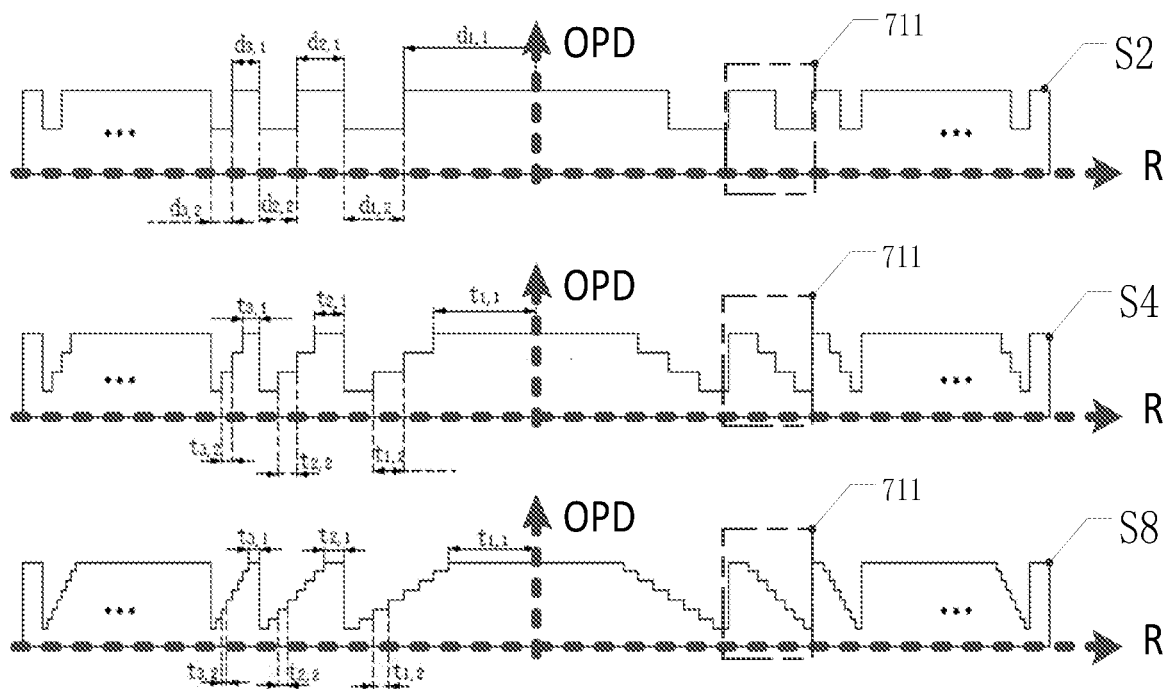
FIG. 2B is a schematic diagram illustrating optical path difference distributions of Fresnel zone plates of a two-step, a four-step and an eight-step type.

FIG. 2A illustrates a schematic plane diagram of a two-step (two-level) phase Fresnel zone plate, and FIG. 2B illustrates optical path difference (OPD) distributions of a two-step (two-level) Fresnel zone plate S2, a four-step (four-level) Fresnel zone plate S4, and an eight-step (eight-level) Fresnel zone plate S8, and as illustrated in FIG. 2B, the optical path difference (OPD) distribution of the two-step (two-level) Fresnel zone plate S2 is corresponding to a cross section plane of the Fresnel zone plate as illustrated in FIG. 2A along line AA'.

For example, each of the Fresnel zone plate may comprises M annuluses 711, M is a positive integer, and each of the annuluses 711 may comprises $N=2^m$ (m=1, 2, 3 . . . ) steps (i.e., OPD steps). For the two-step (two-level) Fresnel zone plate, the four-step (four-level) Fresnel zone plate, and the eight-step (eight-level) Fresnel zone plate, the values of m are respectively 1, 2 and 3. For example, the phase difference between regions, in which two adjacent steps is located, of the Fresnel zone plate may be $2\pi/N$.

It should be noted that, each of the annuluses 711 is not limited to comprise $N=2^m$ (m=1, 2, 3 . . . ) steps, and according to specific implementation demands, each of the annuluses 711 may also adopt other number of steps (for example, six steps, twelve steps, and so on).

For example, as illustrated in FIG. 2A and FIG. 2B, for the two-step (two-level) Fresnel zone plate, $r_{j,1}$ and $r_{j,2}$ are respectively a radius (a radius of an outer ring of the step) of a first step and a radius of a second step in a jth annulus. Here, j is a positive integer smaller than or equal to M. Widths $d_{j,1}$ and $d_{j,2}$ of the two-step (two-level) Fresnel zone plate respectively satisfy following equations:

$$d_{j,1} = r_{j,1} - r_{j-1,2},$$

$$d_{j,2} = r_{j,2} - r_{j,1}.$$

For example, as illustrated in FIG. 2B, for an N-step (N-level) Fresnel zone plate, each of the annuluses 711 comprises N−1 steps (levels) having the same width, one remaining step has a width different from the width of the above-mentioned N−1 steps, and in the jth annulus 711, a width $t_{j,2}$ of the N−1 steps that are in succession and a width $t_{j,1}$ of the remaining step in the jth annulus 711 respectively satisfy following equations:

$$t_{j,2} = \frac{d_{j,2}}{N/2},$$

$$t_{j,1} = d_{j,1} - \sum_{i=1}^{m-1} \frac{d_{j,2}}{2^i}.$$

For example, a radius $r_j$ of the jth annulus and a width $d_j$ of the jth annulus in the Fresnel zone plate (for the two-step (two-level) Fresnel zone plate, $r_j = r_{j,2}$) satisfy following condition:

$$r_j = \sqrt{jf\lambda} \text{ and } d_j = r_j - r_{j-1}.$$

Here, f is the focal length of the Fresnel zone plate, and λ is the wavelength of the light that is incident on the Fresnel zone plate. Therefore, in a case where f and λ are constant values, the width $d_j$ of the jth annulus is decreased along with an increase of j. Correspondingly, the width of each of the steps is decreased along with the increase of j. That is, the width of the annulus at the edge of the Fresnel zone plate and the widths of the steps of the annulus at the edge are small.

For example, the larger the number N of the steps in the Fresnel zone plate, the larger the diffraction efficiency (i.e., the transmittance) of the Fresnel zone plate is. However, the inventor(s) of the present disclosure notes (note) that, in a case where f, λ and j are constant values, the larger the number N of the steps in the Fresnel zone plate, the smaller the widths of the steps are; and in a case where the focal length f of the Fresnel zone plate is relatively small (that is, the degree of the spectacles is relatively large), the widths of the steps are further reduced. Because the minimum width of the steps that can be fabricated by, for example, a photolithography process, is a constant value or is limited by existing equipment in a case where the manufacturing processes are not improved. Therefore, in order to realize a relatively large transmittance, the maximum value of the number j of the annuluses in conventional Fresnel zone plates is relatively small (i.e., the radius of the Fresnel zone plate is relatively small, for example, the radius of the Fresnel zone plate is in hundred-micron range) and/or the focal length f is relatively large (i.e., the degree of the liquid crystal spectacles is relatively small, for example, 100 degrees).

For example, the liquid crystal cell may adopt annulus electrodes that arrange outward from a center of the liquid crystal cell to drive liquid crystal molecules to form a liquid crystal Fresnel zone plate, and the size of the liquid crystal cell is relatively small and the focal length f is relatively large (i.e., the degree of the spectacles is small) and/or the transmittance is relatively small because of the limitation caused by the manufacturing processes for electrodes. For example, the width of the annulus in the zone plate region at the edge of the liquid crystal cell may be 24 micrometers, and the minimum value of the width of a line that can be fabricated by current manufacturing processes is 5 micrometers. In a case where a six steps design is adopted, the width of each electrode is 4 micrometers, and the electrode with the width being equal to 4 micrometers cannot be fabricated by current manufacturing processes. Therefore, the liquid crystal cell cannot form a valid zone plate region at the edge of the liquid crystal cell, such that the size of the liquid crystal cell (the size of the effective working area parallel to the plane of the liquid crystal cell) is relatively small.

At least one embodiment of the present disclosure provides a liquid crystal cell, a method of driving a liquid crystal cell, and a liquid-crystal-based spectacle lens. By setting a second ring-like electrode region with a relatively smaller number of electrodes, the size (for example, the size of the effective working area that is parallel to the plane of the liquid crystal cell) of the liquid crystal cell can be increased and/or the focal length of the liquid crystal cell can be reduced while the transmittance is guaranteed, so as to allow the liquid crystal cell to be suitable for fabricating liquid crystal spectacles and allow the liquid crystal spectacles to be capable of being used by more users.

At least one embodiment of the present disclosure provides a liquid crystal cell. The liquid crystal cell comprises: a ring-like electrode layer, a liquid crystal layer, and an opposite electrode layer. The liquid crystal layer is between the ring-like electrode layer and the opposite electrode layer; the ring-like electrode layer comprises a first ring-like electrode region and a second ring-like electrode region, and the second ring-like electrode region is concentric with the first ring-like electrode region and surrounds the first ring-like electrode region; the first ring-like electrode region is configured to drive corresponding liquid crystal molecules in the liquid crystal layer, so as to form a first Fresnel zone plate region of the liquid crystal cell; the second ring-like electrode region is configured to drive corresponding liquid crystal molecules in the liquid crystal layer, so as to form a second Fresnel zone plate region of the liquid crystal cell; and an order of the second Fresnel zone plate region is smaller than an order of the first Fresnel zone plate region.

Non-limitative descriptions are given to the liquid crystal cell provided by the embodiments of the present disclosure in the following with reference to a plurality of examples. As described in the following, in case of no conflict, different features in these specific examples may be combined so as to obtain new examples, and the new examples are also fall within the scope of the present disclosure.

Figure 3A:
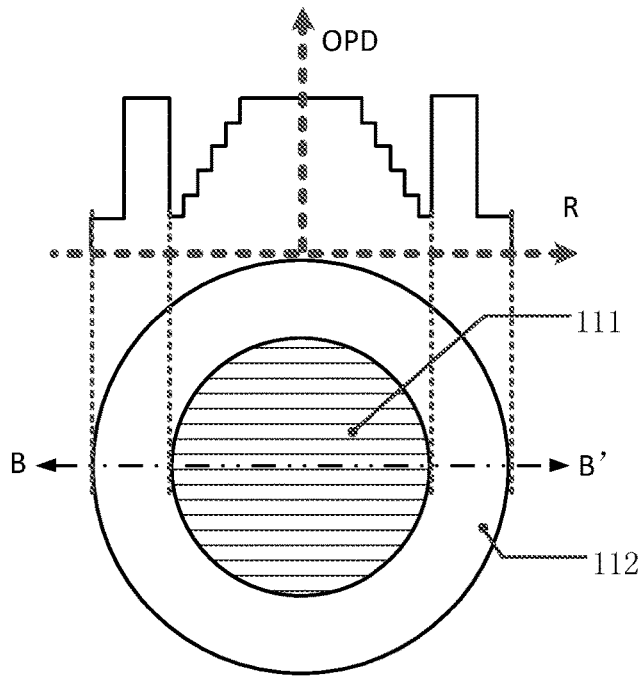
FIG. 3A is a schematic diagram of a liquid crystal cell and a corresponding optical path difference distribution provided by an embodiment of the present disclosure.
Figure 3B:
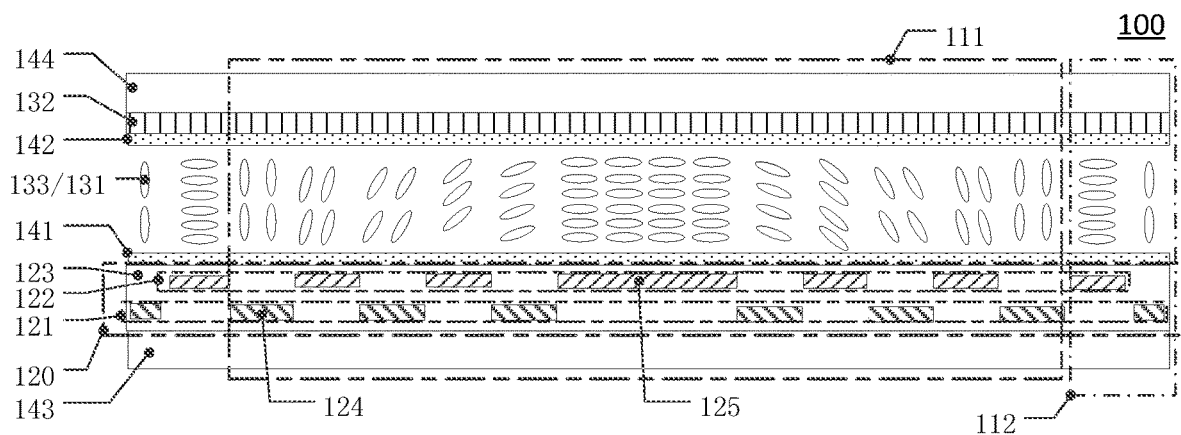
FIG. 3B is a cross-sectional view of the liquid crystal cell as illustrated in FIG. 3A.

For example, FIG. 3A and FIG. 3B illustrates a liquid crystal cell 100, and the liquid crystal cell 100 may be used for forming a Fresnel zone plate, but the embodiments of the present disclosure are not limited to this case.

Figure 3C:
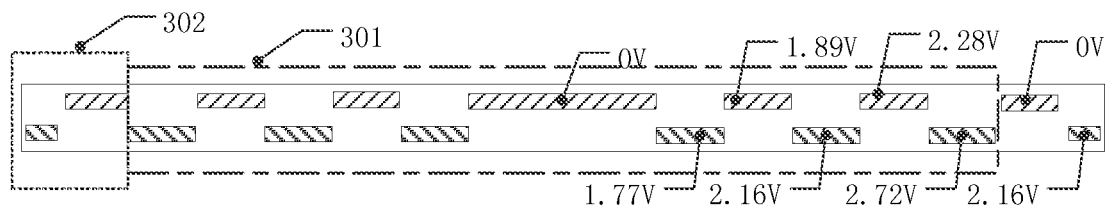
FIG. 3C is a schematic diagram of voltages applied on the liquid crystal cell as illustrated in FIG. 3A.

For example, as illustrated in FIG. 3A and FIG. 3B, the liquid crystal cell 100 comprises a ring-like electrode layer 120, a liquid crystal layer 131, and an opposite electrode layer 132, and the liquid crystal layer 131 is between the ring-like electrode layer 120 and the opposite electrode layer 132. For example, as illustrated in FIG. 3C, the ring-like electrode layer 120 comprises a first ring-like electrode region 301 and a second ring-like electrode region 302, and the second ring-like electrode region 302 is concentric with the first ring-like electrode region 301 and surrounds the first ring-like electrode region 301. For example, the ring-like electrode layer 120 comprises a plurality of ring-like electrodes arranged outward from a center of the ring-like electrode layer 120 along a radial direction of the ring-like electrode layer 120, and the plurality of ring-like electrodes comprise a plurality of first ring-like electrodes 124 and a plurality of second ring-like electrodes 125. For example, in an example, the ring-like electrode layer 120 comprises the plurality of first ring-like electrodes 124 and the plurality of second ring-like electrodes 125, and the plurality of first ring-like electrodes 124 and the plurality of second ring-like electrodes 125 are alternately and sequentially arranged outward from the center of the ring-like electrode layer 120 along the radial direction of the ring-like electrode layer 120. It should be noted that, the second ring-like electrode 125 that is located at the center of the ring-like electrode layer 120 is in a circular shape, and the circular shape may be regarded as a ring shape, the internal diameter of which is equal to zero. Therefore, for the sake of facilitating the description, the electrode at the center is also referred as the ring-like electrode, but this should not be construed as a limitation on the shape of the electrode. For example, as illustrated in FIG. 3C, an amount of ring-like electrodes in the first ring-like electrode region 301 is greater than an amount of ring-like electrodes in the second ring-like electrode region 302. Here, the ring-like electrodes in each of the ring-like electrode regions not only comprise the first ring-like electrodes 124, but also comprise the second ring-like electrodes 125. For example, for the sake of clarity, the specific structure of the ring-like electrode layer 120 is described in detail after the description of the function of the liquid crystal cell 100.

For example, the first ring-like electrode region 301 is configured to drive corresponding liquid crystal molecules in the liquid crystal layer 131, so as to form a first Fresnel zone plate region 111 of the liquid crystal cell 100; the second ring-like electrode region 302 is configured to drive corresponding liquid crystal molecules in the liquid crystal layer 131, so as to form a second Fresnel zone plate region 112 of the liquid crystal cell 100; that is, the liquid crystal cell 100 can provide the first Fresnel zone plate region 111 and the second Fresnel zone plate region 112. For example, the second Fresnel zone plate region 112 is concentric with the first Fresnel zone plate region 111 and surrounds the first Fresnel zone plate region 111. For example, the first Fresnel zone plate region 111 may be a circular shape structure at a center of the formed Fresnel zone plate (for example, the center of the liquid crystal cell 100); and the second Fresnel zone plate region 112 may be an annulus at the edge of the formed Fresnel zone plate (for example, the edge of the liquid crystal cell 100). For example, the first Fresnel zone plate region 111 is in a circular shape, and the second Fresnel zone plate region 112 is in a ring shape; and a radius of the first Fresnel zone plate region 111 is greater than a ring width of the second Fresnel zone plate region 112 (for example, a difference between a radius of an outer ring of the second Fresnel zone plate region 112 and a radius of an inner ring of the second Fresnel zone plate region 112).

For example, the center of the ring-like electrode layer 120 may coincide with the center of the Fresnel zone plate formed by the liquid crystal cell 100. For example, in a case where the center of the ring-like electrode layer 120 coincides with the center of the liquid crystal cell 100, the center of the ring-like electrode layer 120 may also be represented by the center of the liquid crystal cell 100. For example, for the sake of clarity, the embodiments of the present disclosure are described by taking the case where both the center of the ring-like electrode layer 120 and the center of the liquid crystal cell 100 coincide with the center of the Fresnel zone plate as an example, but the embodiments of the present disclosure are not limited to this case.

For example, FIG. 3A also illustrates a schematic diagram of an optical path difference (OPD) distribution of the liquid crystal cell 100 as illustrated in FIG. 3A and FIG. 3B, and the optical path difference distribution illustrates the optical distance that light outputting from different positions of the liquid crystal cell 100 has travelled in the liquid crystal cell 100 (i.e., the thickness of the liquid crystal cell × the effective refractive index of the liquid crystal molecules 133 corresponding to this position). Because the thickness of the liquid crystal cell 100 is uniform, the optical path difference (OPD) distribution corresponds to the distribution of the effective refractive indexes of the liquid crystal molecules 133 in the liquid crystal cell 100.

For example, as illustrated in FIG. 3A, an amount of steps (for example, six steps) of the optical distance in the first Fresnel zone plate region 111 may be greater than an amount of steps (for example, two steps) of the optical distance in the second Fresnel zone plate region 112, that is, an amount of effective refractive indexes of the second Fresnel zone plate region 112 (i.e., an amount of angles between the orientation of the liquid crystal molecules 133 and the normal direction of the liquid crystal cell 100) is smaller than an amount of effective refractive indexes of the first Fresnel zone plate region 111, such that the order of the second Fresnel zone plate region 112 is smaller than the order of the first Fresnel zone plate region 111.

In the following, the embodiments of the present disclosure are described in detail by taking the case where the order of the first Fresnel zone plate region 111 and the order of the second Fresnel zone plate region 112 are respectively six and two as an example, but the order of the first Fresnel zone plate region 111 and the order of the second Fresnel zone plate region 112 provided by the embodiments of the present disclosure are not limited to six and two. According to specific implementation demands, the order of the first Fresnel zone plate region 111 may also be 32, 16, 8, or the like, the order of the second Fresnel zone plate region 112 may also be 4 or the like, and the first Fresnel zone plate region 111 and the second Fresnel zone plate region 112 may also be set to adopt other suitable order.

For example, as illustrated in FIG. 3B, the ring-like electrode layer 120 comprises a plurality of first ring-like electrodes 124 and a plurality of second ring-like electrodes 125, and the plurality of first ring-like electrodes 124 and the plurality of second ring-like electrodes 125 are alternately and sequentially arranged from the center of the liquid crystal cell 100 to outward. For example, orthographic projections of the plurality of first ring-like electrodes 124 and the plurality of second ring-like electrodes 125 on the opposite electrode layer 132 are alternately and sequentially arranged along the radial direction of the ring-like electrodes. Here, a projection of the second ring-like electrode 125 on the opposite electrode layer 132 along a direction perpendicular to the opposite electrode layer 132 denotes the orthographic projection. For example, the plurality of first ring-like electrodes 124 and the plurality of second ring-like electrodes 125 are insulated from each other, that is, the voltage that is applied on any one of the first ring-like electrodes 124 and the second ring-like electrodes 125 cannot be transmitted to adjacent ring-like electrode(s) (the first ring-like electrode 124 or/and the second ring-like electrode 125).

For example, as illustrated in FIG. 3B, in the first Fresnel zone plate region 111, except for the ring-like electrode (for example, the second ring-like electrode 125 at the center) at the center of the formed Fresnel zone plate (for example, the center of the liquid crystal cell 100), all ring widths of the plurality of ring-like electrodes (for example, the first ring-like electrodes 124 and the second ring-like electrodes 125) are identical and are equal to distances between adjacent first ring-like electrodes 124 or adjacent second ring-like electrodes 125. For example, in a case where the order of the second Fresnel zone plate region 112 is greater than two, except for the ring-like electrode (for example, the second ring-like electrode 125 at the center) that is closest to the center of the formed Fresnel zone plate, ring widths of the plurality of ring-like electrodes (for example, the first ring-like electrodes 124 and the second ring-like electrodes 125) are identical and are equal to distances between adjacent first ring-like electrodes 124 or distances between adjacent second ring-like electrodes 125. For example, because the radius of the first Fresnel zone plate region 111 is greater than the ring width of the second Fresnel zone plate region 112, the widths of the ring-like electrodes, except for the ring-like electrode at the center of the formed Fresnel zone plate, in the first Fresnel zone plate region 111, are greater than the widths of the ring-like electrodes, except for the ring-like electrode that is closest to the center of the formed Fresnel zone plate, in the second Fresnel zone plate region 112.

For example, the amount of the ring-like electrodes in the first Fresnel zone plate region 111 (i.e., the sum of the amount of the first ring-like electrodes 124 and the amount of the second ring-like electrodes 125) may be equal to the order of the first Fresnel zone plate region 111, and the amount of the ring-like electrodes in the second Fresnel zone plate region 112 may be equal to the order of the second Fresnel zone plate region 112.

For example, the shape of the ring-like electrodes, except for the ring-like electrode at the center of the formed Fresnel zone plate, in the plurality of ring-like electrodes, may be a circular annulus, an elliptic annulus and so on, and the shape of the ring-like electrode at the center of the formed Fresnel zone plate may be a circle, an ellipse, and so on. For the sake of clarity, the embodiments of the present disclosure also describe the circular electrode at the center of the first Fresnel zone plate region 111 as the ring-like electrode.

For example, the number (for example, six) of the ring-like electrodes in the first Fresnel zone plate region 111 may be greater than the number (for example, two) of the ring-like electrodes in the second Fresnel zone plate region 112, such that the order of the first Fresnel zone plate region 111 can be greater than the order of the second Fresnel zone plate region 112. For example, illustrative descriptions are given below with reference to FIG. 3B and FIG. 3C.

For example, according to specific implementation demands, the liquid crystal cell 100 may further comprise a drive device (not illustrated in figures) and the drive device is electrically connected to the opposite electrode layer 132, the plurality of first ring-like electrodes 124, and the plurality of second ring-like electrodes 125, so as to apply corresponding electrical signals on these electrodes to drive the liquid crystal molecules 133 in the liquid crystal cell 100.

For example, according to specific implementation demands, the liquid crystal cell 100 may further comprise a first alignment layer 141, a second alignment layer 142, a first substrate 143, and a second substrate 144; the first alignment layer 141 is at a side of the ring-like electrode layer 120 close to the liquid crystal layer 131; the second alignment layer 142 is at a side of the opposite electrode layer 132 close to the liquid crystal layer 131; and the liquid crystal layer 131 comprises the plurality of liquid crystal molecules 133. For example, the first alignment layer 141 and the second alignment layer 142 are configured to allow initial orientations of the plurality of liquid crystal molecules 133 to be parallel to the first alignment layer 141 and the second alignment layer 142, and the first alignment layer 141 and the second alignment layer 142 are configured to allow the liquid crystal molecules 133 to be capable of rotating in the plane perpendicular to the liquid crystal cell 100, that is, the driving mode of the liquid crystal molecule 133 may be an electronically controlled birefringence (ECB) driving mode of rotating in a vertical plane, but the embodiments of the present disclosure are not limited to this case. For example, the first alignment layer 141 and the second alignment layer 142 may be made of polyimide (PI), and for example, a desired orientation property is obtained through an orientation treatment based on friction, an orientation treatment based on illumination, and so on.

For example, voltages applied by the drive device to the ring-like electrodes (the first ring-like electrodes 124 and the second ring-like electrodes 125) in the first Fresnel zone plate region 111 may be different from each other, so as to allow the order of the first Fresnel zone plate region 111 to be equal to the amount of the ring-like electrodes in the first Fresnel zone plate region 111. For example, as illustrated in FIG. 3C, for the six ring-like electrodes that are in the first Fresnel zone plate region 111 and arranged outward from the center of the liquid crystal cell 100 to the edge of the liquid crystal cell 100, the voltages applied by the drive device may respectively be 0V, 1.77V, 1.89V, 2.16V, 2.28V and 2.72V. Therefore, the liquid crystal molecules 133 corresponding to the above-mentioned six ring-like electrodes comprise six different rotation angles (for example, the rotation degrees of all the liquid crystal molecules 133 corresponding to a same ring-like electrode are identical, see FIG. 3B), such that the refractive indexes of the liquid crystal molecules 133 corresponding to the above-mentioned six ring-like electrodes for the light that is incident on the liquid crystal molecules 133 corresponding to the above-mentioned six ring-like electrodes are different, so as to allow the order (six) of the first Fresnel zone plate region 111 to be equal to the number (six) of the ring-like electrodes in the first Fresnel zone plate region 111.

For example, voltages applied by the drive device to the ring-like electrodes (the first ring-like electrodes 124 and the second ring-like electrodes 125) in the second Fresnel zone plate region 112 may be different from each other, so as to allow the order of the second Fresnel zone plate region 112 to be equal to the amount of the ring-like electrodes in the second Fresnel zone plate region 112. For example, as illustrated in FIG. 3C, for the two ring-like electrodes that are in the first Fresnel zone plate region 111 and arranged outward from the center of the liquid crystal cell 100 to the edge of the liquid crystal cell 100, the voltages applied by the drive device are respectively 0V and 2.16V. Therefore, the liquid crystal molecules 133 corresponding to the above-mentioned two ring-like electrodes comprise two different rotation angles, such that the refractive indexes of the liquid crystal molecules 133 corresponding to the above-mentioned two ring-like electrodes for the light that is incident on the liquid crystal molecules 133 corresponding to the above-mentioned two ring-like electrodes are different, which allows the order (two) of the second Fresnel zone plate region 112 to be equal to the number (two) of the ring-like electrodes in the second Fresnel zone plate region 112.

For example, by allowing the amount of the ring-like electrodes in the first Fresnel zone plate region 111 to be greater than the amount of the ring-like electrodes in the second Fresnel zone plate region 112, the amount of the effective refractive indexes (i.e., the amount of the angles between the orientations of the liquid crystal molecules 133 and the normal direction of the liquid crystal cell 100) of the second Fresnel zone plate region 112 can be smaller than the amount of the effective refractive indexes of the first Fresnel zone plate region 111, such that the order of the second Fresnel zone plate region 112 can be smaller than the order of the first Fresnel zone plate region 111.

For example, in a case where the transmittance and the focal length of the liquid crystal cell 100 and the size of the liquid crystal cell 100 (for example, the radius of the liquid crystal cell 100) are constant values, by setting the second ring-like electrode region 302 with a relatively smaller number of electrodes at the edge of the liquid crystal cell 100 (for example, by setting the second Fresnel zone plate region 112 with a relatively lower order at the edge of the liquid crystal cell 100), the widths of the steps at the edge of the liquid crystal cell 100 can be increased (the width of the annulus is unchanged, and the amount of the steps is reduced), and therefore, the manufacturing difficulty can be reduced, or, a liquid crystal cell 100 with lager size (for example, the radius of the effective working area of the liquid crystal cell 100) can be fabricated at the same manufacturing condition. For example, in a case where the transmittance of the liquid crystal cell 100, the size of the liquid crystal cell 100 (for example, the radius of the liquid crystal cell 100), and the widths of the steps at the edge of the liquid crystal cell 100 are constant values, by providing the second ring-like electrode region 302 with a relatively smaller number of electrodes at the edge of the liquid crystal cell 100, the focal length of the liquid crystal cell 100 can be further reduced, that is, the degree of spectacles including the liquid crystal cell 100 can be further increased (for example, the degree of spectacles is increased from 100 degrees to 200 degrees or an even larger degree). Therefore, by setting the second ring-like electrode region 302 with a relatively smaller number of electrodes at the edge of the liquid crystal cell 100, the size of the liquid crystal cell 100 can be increased and/or the focal length of the liquid crystal cell 100 can be reduced while the transmittance (i.e., the diffraction efficiency) is guaranteed, such that the liquid crystal cell 100 is suitable to be used in fabricating the liquid crystal spectacles. In addition, because the sight line of a human' eye mainly passes the center of the Fresnel zone plate, the adversely influence of the design adopting mixed number of steps on the use experience of the liquid crystal spectacles including the liquid crystal cell 100 is little.

For example, as illustrated in FIG. 3B, the ring-like electrode layer 120 comprises a first electrode layer 121 and a second electrode layer 122 that are insulated from each other, and the second electrode layer 122 is closer to the liquid crystal layer 131 as compared to the first electrode layer 121. For example, as illustrated in FIG. 3B, the ring-like electrode layer 120 may further comprise an insulation layer 123 that allows the first electrode layer 121 and the second electrode layer 122 to be insulated from each other. For example, as illustrated in FIG. 3B, the first electrode layer 121 comprises the plurality of first ring-like electrodes 124 that are sequentially arranged outward from the center of the liquid crystal cell 100 (for example, the center of the formed Fresnel zone plate), and the plurality of first ring-like electrodes 124 are concentric and insulated from each other; and the second electrode layer 122 comprises the plurality of second ring-like electrodes 125 that are sequentially arranged outward from the center of the liquid crystal cell 100, and the plurality of second ring-like electrodes 125 are concentric and insulated from each other. For example, an orthographic projection of each of the first ring-like electrodes 124 on the second electrode layer 122 at least partially overlaps a gap between corresponding second ring-like electrodes 125, that is, at least part of the orthographic projection of each of the first ring-like electrodes 124 on the second electrode layer 122 is in the gap between the corresponding second ring-like electrodes 125. Here, the orthographic projection of the first ring-like electrode 124 on the second electrode layer 122 is the projection of the first ring-like electrode 124 on the second electrode layer 122 along the direction perpendicular to the second electrode layer 122.

It should be noted that, the ring-like electrode at the center of the liquid crystal cell 100 provided by the embodiments of the present disclosure is not limited to be the second ring-like electrode 125 at the second electrode layer 122 as illustrated in FIG. 3B, and may also be the first ring-like electrode 124 at the first electrode layer 121, and no further description is given here.

For example, by setting the first electrode layer 121 and the second electrode layer 122 that are at different layers in the ring-like electrode layer 120, the distance between adjacent orthographic projections of the first ring-like electrodes 124 and the second ring-like electrodes 125 on the opposite electrode layer 132 are reduced while no short circuit is caused.

For example, the gap between adjacent second ring-like electrodes 125 can be completely covered by the orthographic projection of a corresponding first ring-like electrode 124 on the second electrode layer 122; that is, there is no gap between the orthographic projection of the first ring-like electrode 124 on the opposite electrode layer 132 and the orthographic projection of the second ring-like electrode 125 on the opposite electrode layer 132. In this case, all the liquid crystal molecules 133 in the liquid crystal layer 131 can be driven by the voltages and can be rotated to a pre-determined angle, such that the liquid crystal layer 131 can be controlled with a better effect, and better diffraction effect and better focusing effect can be realized.

For example, the edge of the orthographic projection of each of the first ring-like electrodes 124 on the second electrode layer 122 just connects the edge of a corresponding second ring-like electrode 125; in this case, because the orthographic projection of the first ring-like electrode 124 on the opposite electrode layer 132 and the orthographic projection of the second ring-like electrode 125 on the opposite electrode layer 132 are not overlapped, the adverse influence of the voltage, that is applied on the first ring-like electrode 124, on the voltage applied on the second ring-like electrode 125 can be reduced, and the control effect of the liquid crystal molecules 133 can be further improved and the diffraction effect and the focusing effect can be improved.

For example, as illustrated in FIG. 3B, the opposite electrode layer 132 may be a plate electrode, but the embodiments of the present disclosure are not limited to this case. For example, the opposite electrode layer 132 may also comprise a structure that is similar to the ring-like electrode layer 120, that is, the opposite electrode layer 132 may comprise a third electrode layer and a fourth electrode layer that are insulated from each other, and the arrangements of the third electrode layer and the fourth electrode layer are similar to that of the first electrode layer 121 and the second electrode layer 122. In this case, the specific structure of the opposite electrode layer 132 may be referred to the ring-like electrode layer 120, and no further description is given here.

It should be noted that, according to specific implementation demands, the ring-like electrode layer 120 provided by the embodiments of the present disclosure may further comprise a third ring-like electrode region, a fourth ring-like electrode region, a fifth ring-like electrode region, a sixth ring-like electrode region, and so on, and the third ring-like electrode region, the fourth ring-like electrode region, the fifth ring-like electrode region, and the sixth ring-like electrode region are respectively configured to drive corresponding liquid crystal molecules 133 in the liquid crystal layer 131, so as to respectively form a third Fresnel zone plate region 113, a fourth Fresnel zone plate region 114, a fifth Fresnel zone plate 115, a sixth Fresnel zone plate 116, and so on, of the liquid crystal cell 100. The third ring-like electrode region, the fourth ring-like electrode region, the fifth ring-like electrode region, and the sixth ring-like electrode region are respectively part of the ring-like electrode layer 120 that is in the third Fresnel zone plate region 113, part of the ring-like electrode layer 120 that is in the fourth Fresnel zone plate region 114, part of the ring-like electrode layer 120 that is in the fifth Fresnel zone plate region 115, and part of the ring-like electrode layer 120 that is in the sixth Fresnel zone plate region 116. In this case, the position relationship and the size relationship between any one of the third ring-like electrode region, the fourth ring-like electrode region, the fifth ring-like electrode region, the sixth ring-like electrode region and any one of the first ring-like electrode region 301 and the second ring-like electrode region 302 can be obtained by referring to the position relationship and the size relationship between any one of the third Fresnel zone plate region 113, the fourth Fresnel zone plate region 114, the fifth Fresnel zone plate region 115, and the sixth Fresnel zone plate region 116 and any one of the first Fresnel zone plate region 111 and the second Fresnel zone plate region 112, and no further description is given here. The amounts of the ring-like electrode regions and the Fresnel zone plate regions are not limited and may be set according to specific demands. The shape of the ring-like electrode region is not limited. For example, the ring-like electrode region may be a complete annulus, and may also be formed by annulus segments that are separated from each other. For example, the ring-like electrode region may be a segment, that are formed by half circular ring, of an annulus, and this may be set according to specific demands.

Figure 4:
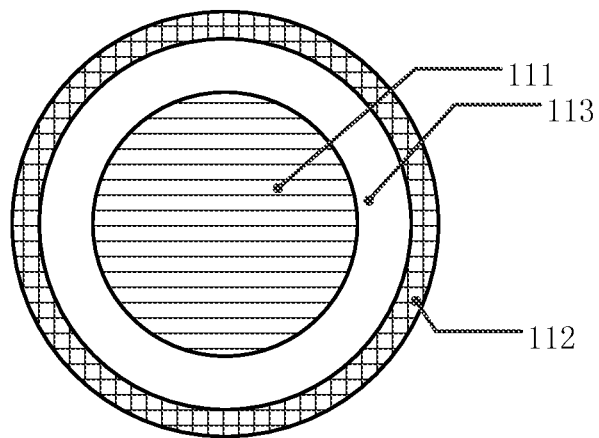
FIG. 4 is a plan view of another liquid crystal cell provided by an embodiment of the present disclosure.

For example, as illustrated in FIG. 4, the liquid crystal cell 100 provided by the embodiments of the present disclosure may further comprise a third Fresnel zone plate region 113, and the third Fresnel zone plate region 113 is concentric with the first Fresnel zone plate region 111 and surrounds the first Fresnel zone plate region 111; and the second Fresnel zone plate region 112 surrounds the third Fresnel zone plate region 113. For example, an order of the third Fresnel zone plate region 113 is smaller than the order of the first Fresnel zone plate region 111 and is greater than the order of the second Fresnel zone plate region 112, or, the order of the third Fresnel zone plate region 113 is equal to the order of the first Fresnel zone plate region 111 or the order of the second Fresnel zone plate region 112.

For example, in the case where the order of the first Fresnel zone plate region 111 and the order of the second Fresnel zone plate region 112 are respectively six and two, the order of the third Fresnel zone plate region 113 may be four. For example, correspondingly, the amount of the ring-like electrodes in the third Fresnel zone plate region 113 may be four, and voltages applied to the above-mentioned four ring-like electrodes may be different from each other.

For example, a ring width (or, a width of the steps) of the third Fresnel zone plate region 113 is greater than a ring width (or, a width of the steps) of the second Fresnel zone plate region 112, and is smaller than a ring width (or, a width of the steps) of the first Fresnel zone plate region 111; and a diffraction efficiency (or, transmittance) of the third Fresnel zone plate region 113 is greater than a diffraction efficiency (or, transmittance) of the second Fresnel zone plate region 112, and is smaller than a diffraction efficiency (or, transmittance) of the first Fresnel zone plate region 111.

For example, by providing the third Fresnel zone plate region 113, the order of which is between the order of the first Fresnel zone plate region 111 and the order of the second Fresnel zone plate region 112, not only the overall transmittance of the liquid crystal cell 100 can be increased, but also the uniformity of the transmittance of the liquid crystal cell 100 along the radial direction of the Fresnel zone plate can be increased.

For example, a plurality of Fresnel zone plate regions with different orders may be provided between the first Fresnel zone plate region 111 and the second Fresnel zone plate region 112 according to specific implementation demands, and the order of the first Fresnel zone plate region 111 and the order of the second Fresnel zone plate region 112. For example, in a case where the order of the first Fresnel zone plate region 111 and the order of the second Fresnel zone plate region 112 are respectively 32 and 2, seven Fresnel zone plate regions, the orders of which are respectively 16, 14, 12, 10, 8, 6, and 4, may be sequentially provided between the first Fresnel zone plate region 111 and the second Fresnel zone plate region 112, and in this case, amounts of ring-like electrodes in the above-mentioned seven Fresnel zone plate regions may respectively be 16, 14, 12, 10, 8, 6, and 4.

For example, in the case where the order of the first Fresnel zone plate region 111 and the order of the second Fresnel zone plate region 112 are respectively six and two, the order of the third Fresnel zone plate region 113 may also be six or two.

For example, in a case where the order of the third Fresnel zone plate region 113 is six, the amount of the ring-like electrodes in the third Fresnel zone plate region 113 may be six, and voltages applied to the above-mentioned six ring-like electrodes may be different from each other. For example, the voltages applied to the above-mentioned six ring-like electrodes in the third Fresnel zone plate region 113 may respectively correspond to the voltages (for example, may respectively be 0V, 1.77V, 1.89V, 2.16V, 2.28V, and 2.72V) applied to the six ring-like electrodes in the first Fresnel zone plate region 111.

For example, in a case where the order of the third Fresnel zone plate region 113 is two, the amount of the ring-like electrodes in the third Fresnel zone plate region 113 may be two, and voltages applied to the above-mentioned two ring-like electrodes may be different from each other. For example, the voltages applied to the two ring-like electrodes in the third Fresnel zone plate region 113 may respectively correspond to the voltages (for example, may respectively be 0V and 2.16V) applied to the two ring-like electrodes in the second Fresnel zone plate region 112.

For example, by allowing the order of the third Fresnel zone plate region 113 to be equal to the order of the first Fresnel zone plate region 111 or the order of the second Fresnel zone plate region 112, the size of the Fresnel zone plate formed by the liquid crystal cell 100 can be increased without increasing the complexity of driving.

Figure 5:
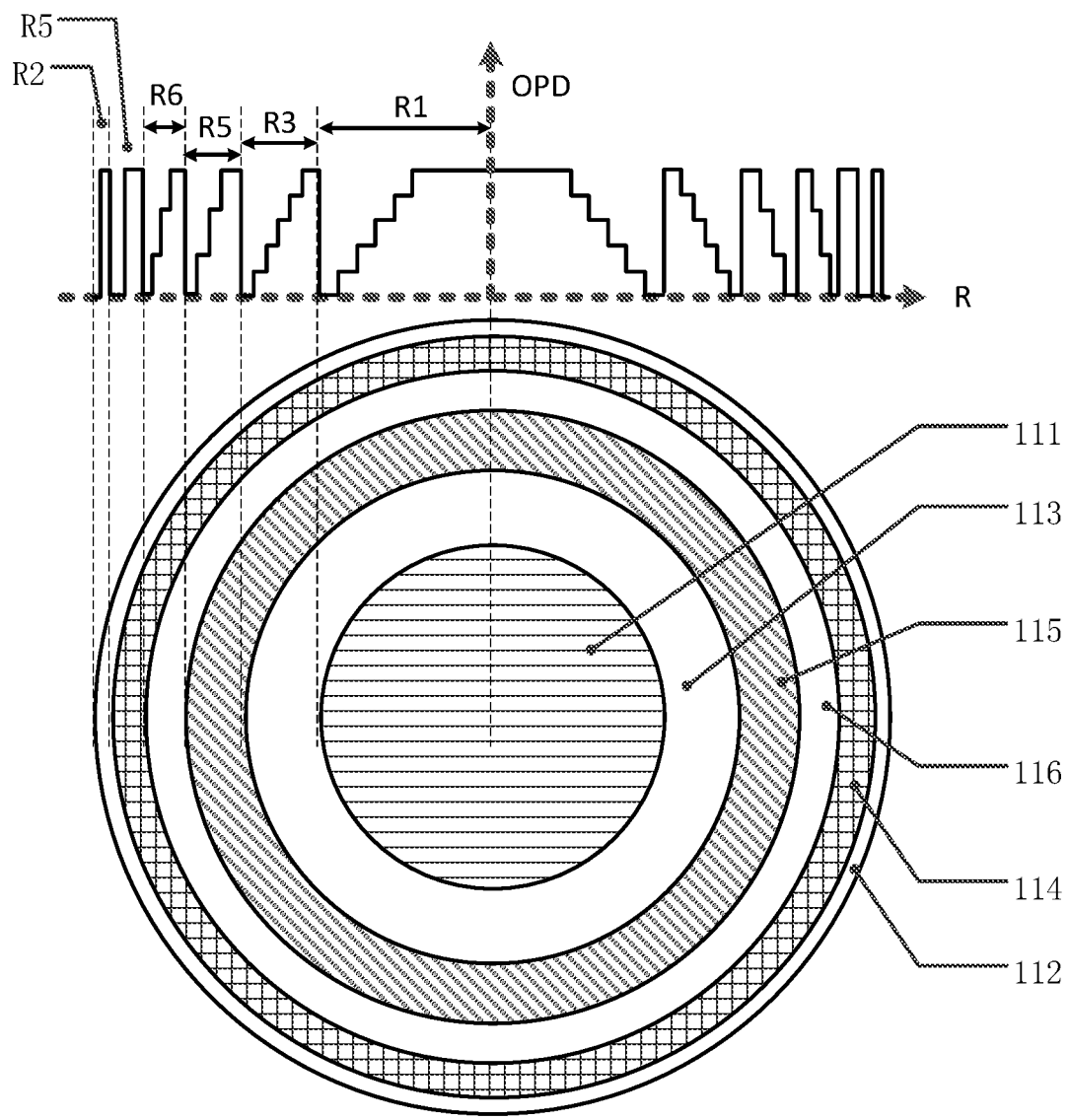
FIG. 5 is a plan view of further another liquid crystal cell and an optical path difference distribution provided by an embodiment of the present disclosure.

For example, as illustrated in FIG. 5, in the case where the order of the third Fresnel zone plate region 113 is six, according to specific implementation demands, the liquid crystal cell 100 may further comprise a fourth Fresnel zone plate region 114; and the fourth Fresnel zone plate region 114 is concentric with the third Fresnel zone plate region 113 and surrounds the third Fresnel zone plate region 113, and the second Fresnel zone plate region 112 surrounds the fourth Fresnel zone plate region 114. For example, an order of the fourth Fresnel zone plate region 114 may be equal to the order of the second Fresnel zone plate region 112, such that the size of the Fresnel zone plate formed by the liquid crystal cell 100 can be further increased without increasing the complexity of driving.

For example, according to specific implementation demands, the liquid crystal cell 100 as illustrated in FIG. 5 may further comprise more zone plate regions (a plurality of zone plate regions), orders of which are equal to the order of the first Fresnel zone plate region 111, that surround the third Fresnel zone plate region 113, and the fourth Fresnel zone plate region 114 surrounds the plurality of zone plate regions as mentioned above. For example, along the direction from the center of the liquid crystal cell 100 toward the edge of the liquid crystal cell 100, ring widths of the plurality of zone plate regions, the orders of which are equal to the order of the first Fresnel zone plate region 111, are gradually reduced. Therefore, in a case where the ring width is reduced to a value which cannot be fabricated by current manufacturing process, zone plate regions, the orders of which are equal to the order of the first Fresnel zone plate region 111, are not provided, that is, the amount of the plurality of zone plate regions, the orders of which are equal to the order of the first Fresnel zone plate region 111, as mentioned above, can be maximized as long as the manufacturing process allows, such that the diffraction efficiency and the transmittance of the liquid crystal cell can be maximized.

For example, according to specific implementation demands, the liquid crystal cell 100 as illustrated in FIG. 5 may further comprise more zone plate regions (a plurality of zone plate regions), orders of which are equal to the order of the second Fresnel zone plate region 112, that surround the fourth Fresnel zone plate region 114, and the second Fresnel zone plate region 112 surrounds the plurality of zone plate regions. For example, the amount of the plurality of zone plate regions, the orders of which are equal to the order of the fourth Fresnel zone plate region 114, as mentioned above, can be maximized as long as the manufacturing process allows, such that the size of the Fresnel zone plate formed by the liquid crystal cell 100 can be maximized.

For example, as illustrated in FIG. 5, according to specific implementation demands, the liquid crystal cell 100 may further comprise a fifth Fresnel zone plate 115 and a sixth Fresnel zone plate 116; the fifth Fresnel zone plate region 115 is concentric with the third Fresnel zone plate region 113 and surrounds the third Fresnel zone plate region 113, and the sixth Fresnel zone plate region 116 is concentric with the fifth Fresnel zone plate region 115 and surrounds the fifth Fresnel zone plate region 115; and the fourth Fresnel zone plate region 114 is concentric with the sixth Fresnel zone plate region 116 and surrounds the sixth Fresnel zone plate region 116. For example, both of the order of the fifth Fresnel zone plate region 115 and the order of the sixth Fresnel zone plate region 116 may be equal to four. For example, the amount of the ring-like electrodes in the fifth Fresnel zone plate region 115 and the amount of the ring-like electrodes in the sixth Fresnel zone plate region 116 may respectively equal to four. The voltages applied to the four ring-like electrodes in the fifth Fresnel zone plate region 115 may be different from each other (for example, for the four ring-like electrodes arranged along the direction from the center of the Fresnel zone plate toward the edge of the Fresnel zone plate, the applied voltages may respectively be 0V, 1.87V, 2.12V, and 2.53V); and the voltages applied to the four ring-like electrodes in the sixth Fresnel zone plate region 116 may respectively correspond to the voltages applied to the four ring-like electrodes in the fifth Fresnel zone plate region 115 (for example, for the four ring-like electrodes arranged along the direction from the center of the Fresnel zone plate toward the edge of the Fresnel zone plate, the applied voltages may respectively be 0V, 1.87V, 2.12V, and 2.53V). For example, by providing the fifth Fresnel zone plate region 115 and the sixth Fresnel zone plate region 116, the overall transmittance of the liquid crystal cell 100 can be increased and the uniformity of the transmittance of the liquid crystal cell 100 along the radial direction of the Fresnel zone plate can be increased.

At least one embodiment of the present disclosure further provides a liquid-crystal-based spectacle lens 200, and the liquid-crystal-based spectacle lens 200 comprises a first liquid crystal cell 201 and a second liquid crystal cell 202 that are stacked. Each of the first liquid crystal cell 201 and the second liquid crystal cell 202 is the liquid crystal cell 100 provided by any one of the above-mentioned embodiments of the present disclosure, and the first liquid crystal cell 201 and the second liquid crystal cell 202 have a same structure; and an orientation direction of the liquid crystal layer 131 in the first liquid crystal cell 201 and an orientation direction of the liquid crystal layer 131 in the second liquid crystal cell 202 are perpendicular to each other in a plane perpendicular to a direction along which the first liquid crystal cell 201 and the second liquid crystal cell 202 are stacked.

For example, the liquid-crystal-based spectacle lens 200 provided by the embodiments of the present disclosure are described below illustratively with reference to FIG. 6A-FIG. 6C.

Figure 6A:
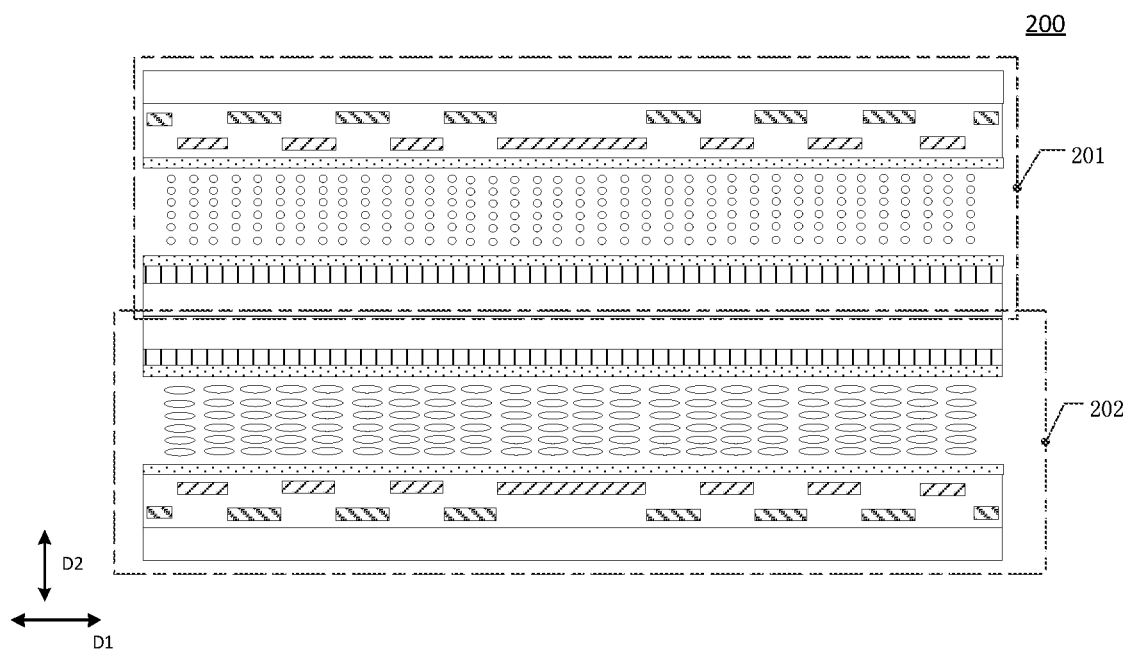
FIG. 6A is a cross-sectional view of a liquid-crystal-based spectacle lens provided by an embodiment of the present disclosure.
Figure 6B:
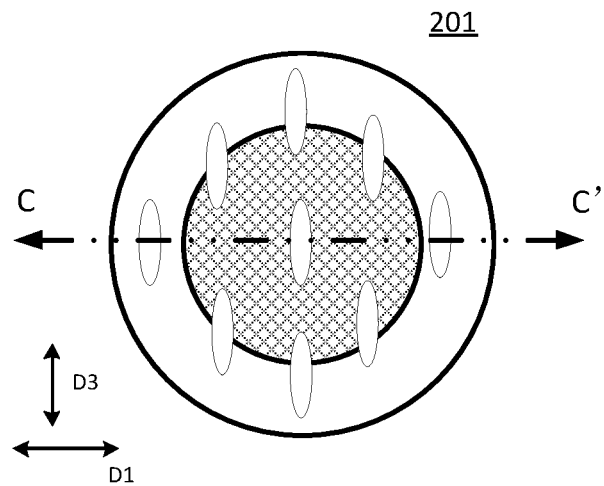
FIG. 6B is a schematic diagram of a first liquid crystal cell in the liquid-crystal-based spectacle lens as illustrated FIG. 6A.
Figure 6C:
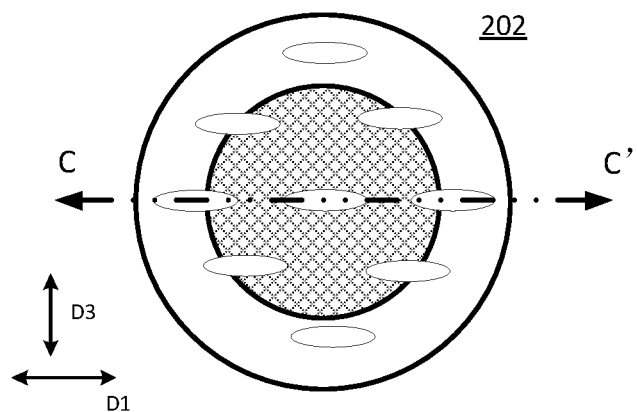
FIG. 6C is a schematic diagram of a second liquid crystal cell in the liquid-crystal-based spectacle lens as illustrated FIG. 6A.

For example, FIG. 6A illustrates a cross-sectional view of the liquid-crystal-based spectacle lens 200; the liquid-crystal-based spectacle lens 200 comprises the first liquid crystal cell 201 and the second liquid crystal cell 202; FIG. 6B and FIG. 6C respectively illustrate plan views of the first liquid crystal cell 201 and the second liquid crystal cell 202; the cross-sectional view of the liquid-crystal-based spectacle lens 200 as illustrated in FIG. 6A is obtained by sectioning the first liquid crystal cell 201 and the second liquid crystal cell 202 along line CC' as illustrated in FIG. 6B and FIG. 6C.

For example, as illustrated in FIG. 6A, the first liquid crystal cell 201 and the second liquid crystal cell 202 have a same structure, and may be the liquid crystal cell 100 provided by any embodiment of the present disclosure.

For example, as illustrated in FIG. 6A, an initial orientation direction of the liquid crystal layer 131 in the first liquid crystal cell 201 is parallel to the plane perpendicular to the direction (i.e., a second direction D2) along which the first liquid crystal cell 201 and the second liquid crystal cell 202 are stacked, and an initial orientation direction of the liquid crystal layer 131 in the second liquid crystal cell 202 is also parallel to the plane perpendicular to the direction (i.e., the second direction D2) along which the first liquid crystal cell 201 and the second liquid crystal cell 202 are stacked. The orientation direction (for example, a third direction D3) of the liquid crystal layer 131 in the first liquid crystal cell 201 and the orientation direction of the liquid crystal layer 131 in the second liquid crystal cell 202 (for example, the first direction D1) are perpendicular to each other (for example, are perpendicular to each other at any time) in the plane perpendicular to the direction along which the first liquid crystal cell 201 and the second liquid crystal cell 202 are stacked. For example, any two of the first direction D1, the second direction D2, and the third direction D3 are perpendicular to each other. As mentioned above, the initial orientation direction of the liquid crystal layer in the liquid crystal cell is obtained through an alignment layer. For example, a rubbing direction of the alignment layer in the first liquid crystal cell 201 and a rubbing direction of the alignment layer in the second liquid crystal cell 202 are perpendicular to each other.

For example, the liquid crystal molecules 133 in the first liquid crystal cell 201 may rotate in the plane that is perpendicular to the first direction D1 in a case where voltages are applied to the first liquid crystal cell 201; and the liquid crystal molecules 133 in the second liquid crystal cell 202 may rotate in the plane that is perpendicular to the third direction D3 in a case where voltages are applied to the second liquid crystal cell 202.

For example, light that is incident on the liquid-crystal-based spectacle lens 200 may comprises p-polarized light (for example, the component of light with a polarization direction along the third direction D3) and s-polarized light (for example, the component of light with a polarization direction along the first direction D1). For example, in a case where the rotation degree of the liquid crystal molecules 133 in the first liquid crystal cell 201 changes, the effective refractive index of the liquid crystal molecules 133 in the first liquid crystal cell 201 for the p-polarized light changes accordingly; however, the effective refractive index of the liquid crystal molecules 133 in the first liquid crystal cell 201 for the s-polarized light remains unchanged. For example, in a case where the rotation degree of the liquid crystal molecules 133 in the second liquid crystal cell 202 changes, the effective refractive index of the liquid crystal molecules 133 in the second liquid crystal cell 202 for the s-polarized light changes accordingly; however, the effective refractive index of the liquid crystal molecules 133 in the second liquid crystal cell 202 for the p-polarized light remains unchanged. Therefore, the liquid-crystal-based spectacle lens 200 as illustrated in FIG. 6A has a focusing effect for both of the p-polarized light and the s-polarized light because of the first liquid crystal cell 201 and the second liquid crystal cell 202, such that a user can observe more information while looking though the liquid crystal spectacles and the user experience can be improved, in a case where the liquid-crystal-based spectacle lens 200 as illustrated in FIG. 6A is implemented as the liquid crystal spectacles.

Figure 7:
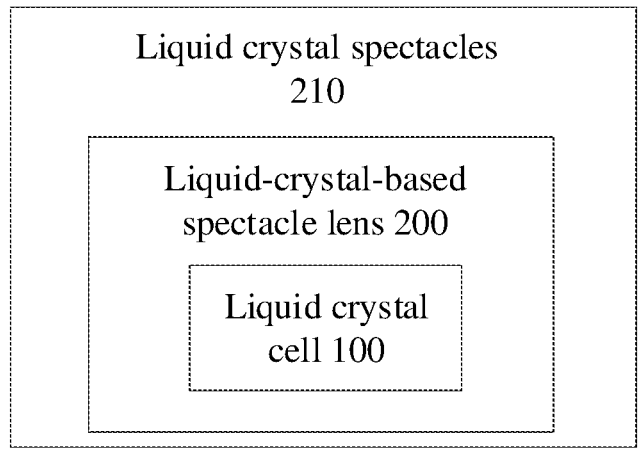
FIG. 7 is an exemplary block diagram of a liquid crystal spectacles provided by an embodiment of the present disclosure.

At least one embodiment of the present disclosure also provides a pair of liquid crystal spectacles 210. For example, as illustrated in FIG. 7, the liquid crystal spectacles 210 comprise the liquid crystal cell 100 provided by any embodiment of the present disclosure or the liquid-crystal-based spectacle lens 200 provided by any embodiment of the present disclosure. It should be noted that, other components (for example, a spectacles frame, a sealant, and so on) of the liquid crystal spectacles 210 and the liquid-crystal-based spectacle lens 200 may adopt conventional components that are suitable, which should be understood by those skilled in the art, no further description is given herein, and it should not be construed as a limitation on the embodiments of the present disclosure.

Figure 8:
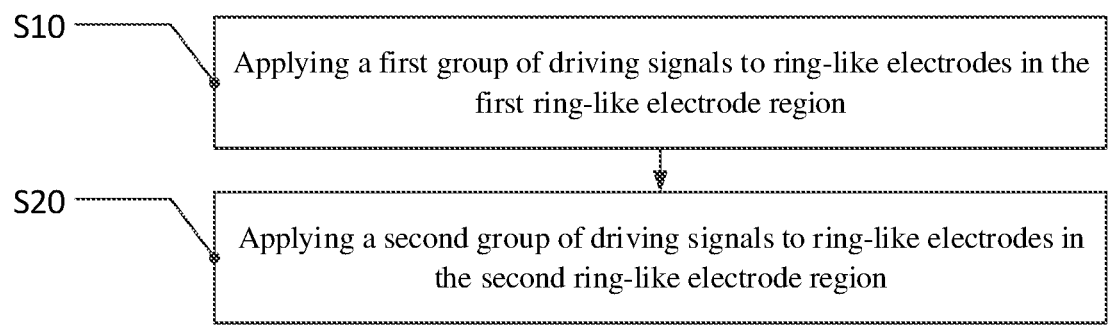
FIG. 8 is an exemplary flow chart of a method of driving a liquid crystal cell provided by an embodiment of the present disclosure.

At least one embodiment of the present disclosure further provides a method of driving the liquid crystal cell provided by any embodiment of the present disclosure. For example, as illustrated in FIG. 8, the method comprises following steps.

Step S10: applying a first group of driving signals to ring-like electrodes in the first ring-like electrode region.

Step S20: applying a second group of driving signals to ring-like electrodes in the second ring-like electrode region.

For example, the above-mentioned method is described illustratively with reference to the liquid crystal cell 100 as illustrated in FIG. 3A and FIG. 3B. For example, while applying the first group of driving signals and the second group of driving signals, an opposite voltage signal may be applied to the opposite electrode layer 132. For example, the opposite voltage signal is a common voltage signal, for example, a grounded signal.

For example, the first group of driving signals are configured to drive corresponding liquid crystal molecules 133 in the liquid crystal layer 131, so as to form the first Fresnel zone plate region 111 of the liquid crystal cell 100; and the second group of driving signals are configured to drive corresponding liquid crystal molecules 133 in the liquid crystal layer 131, so as to form the second Fresnel zone plate region 112 of the liquid crystal cell 100. For example, the order of the second Fresnel zone plate region 112 is smaller than the order of the first Fresnel zone plate region 111.

It should be noted that, in the embodiments of the present disclosure, "applying driving signals (for example, the first group of driving signals) to the Fresnel zone plate regions (for example, the first Fresnel zone plate region 111)" denotes that driving signals are applied to the ring-like electrodes and the liquid crystal molecules corresponding to the Fresnel zone plate regions.

For example, the voltages applied to the ring-like electrodes in the first Fresnel zone plate region 111 may be different from each other. For example, as illustrated in FIG. 3C, in the case where the amount of the ring-like electrodes in the first Fresnel zone plate region 111 is six, for the six ring-like electrodes that are in the first Fresnel zone plate region 111 and arranged outward from the center of the liquid crystal cell 100 to the edge of the liquid crystal cell 100, the applied voltages may respectively be 0V, 1.77V, 1.89V, 2.16V, 2.28V, and 2.72V. Therefore, the liquid crystal molecules 133 corresponding to the above-mentioned six ring-like electrodes correspond to six different rotation angles (for example, all the liquid crystal molecules 133 corresponding to a same ring-like electrode have the same rotation degree, see FIG. 3B), such that the liquid crystal molecules 133 corresponding to the above-mentioned six ring-like electrodes have different refractive indexes for light that is incident onto the liquid crystal molecules 133, so as to allow the order (six) of the first Fresnel zone plate region 111 to be equal to the number (six) of the ring-like electrodes in the first Fresnel zone plate region 111.

For example, the voltages applied to the ring-like electrodes in the second Fresnel zone plate region 112 may be different from each other. For example, as illustrated in FIG. 3C, in the case where the amount of the ring-like electrodes in the second Fresnel zone plate region 112 is two, the voltages applied to the two ring-like electrodes that are in the second Fresnel zone plate region 112 and arranged outward from the center of the liquid crystal cell 100 to the edge of the liquid crystal cell 100 may respectively be 0V and 2.16V. Therefore, the liquid crystal molecules 133 corresponding to the above-mentioned two ring-like electrodes correspond to two different rotation angles, such that the liquid crystal molecules 133 corresponding to the above-mentioned two ring-like electrodes have different refractive indexes for light that is incident onto the liquid crystal molecules 133, so as to allow the order (two) of the second Fresnel zone plate region 112 to be equal to the number (two) of the ring-like electrodes in the second Fresnel zone plate region 112.

For example, by allowing the amount of the ring-like electrodes in the first Fresnel zone plate region 111 to be greater than the amount of the ring-like electrodes in the second Fresnel zone plate region 112, and allowing the amount of voltage signals in the first group of driving signals (for example, the amount of voltage signals that have different voltage values) to be greater than the amount of voltage signals in the second group of driving signals, the amount of the effective refractive indexes of the second Fresnel zone plate region 112 (i.e., the amount of the angles between the liquid crystal molecules 133 and the normal direction of the liquid crystal cell 100) is smaller than the amount of the effective refractive indexes of the first Fresnel zone plate region 111, so that the order of the second Fresnel zone plate region 112 is smaller than the order of the first Fresnel zone plate region 111.

For example, in the case where the transmittance and the focal length of the liquid crystal cell and the size of the liquid crystal cell (for example, the radius of the effective working area of the liquid crystal cell) are constant values, by providing the second ring-like electrode region 302 with a relatively smaller number of electrodes at the edge of the liquid crystal cell, the widths of the steps at the edge of the liquid crystal cell can be increased (the ring width is unchanged, and the amount of the steps is reduced), and therefore, the manufacturing difficulty can be reduced, or, a liquid crystal cell with lager size (for example, the radius of the liquid crystal cell) can be fabricated at the same manufacturing condition. For example, in the case where the transmittance of the liquid crystal cell, the size of the liquid crystal cell (for example, the radius of the effective working area of the liquid crystal cell), and the widths of the steps at the edge of the liquid crystal cell are constant values, by providing the second ring-like electrode region 302 with a relatively smaller number of electrodes at the edge of the liquid crystal cell, the focal length of the liquid crystal cell is reduced, and the degree of spectacles including the liquid crystal cell is increased. Therefore, by providing the second ring-like electrode region 302 with a relatively smaller number of electrodes at the edge of the liquid crystal cell, the size of the liquid crystal cell can be increased and/or the focal length of the liquid crystal cell is decreased while the transmittance (i.e., the diffraction efficiency) is guaranteed, so as to allow the liquid crystal cell to be suitable for fabricating the liquid crystal spectacles.

For example, the voltages applied to the ring-like electrodes in the first Fresnel zone plate region 111 may change along the radial direction of the ring-like electrodes monotonically, such that the complexity of driving can be reduced, and the control effect of the liquid crystal molecules (for example, the distribution pattern of the liquid crystal molecules) can be improved. For example, the voltages applied to the ring-like electrodes in the first Fresnel zone plate region 111 may be increased monotonically along the direction from the center of the Fresnel zone plate to the edge of the Fresnel zone plate, but the embodiments of the present disclosure are not limited to this case. For example, the voltages applied to the ring-like electrodes in the second Fresnel zone plate region 112 may change along the radial direction of the ring-like electrodes monotonically. For example, the voltages applied to the ring-like electrodes in the second Fresnel zone plate region 112 may be increased monotonically along the direction from the center of the Fresnel zone plate to the edge of the Fresnel zone plate, but the embodiments of the present disclosure are not limited to this case.

For example, as illustrated in FIG. 4, in the case where the liquid crystal cell further comprises the third Fresnel zone plate region 113, the method further comprises: applying a third group of driving signals to the third Fresnel zone plate region 113.

For example, as illustrated in FIG. 4, the third Fresnel zone plate region 113 is concentric with the first Fresnel zone plate region 111 and surrounds the first Fresnel zone plate region 111, and the second Fresnel zone plate region 112 surrounds the third Fresnel zone plate region 113.

For example, in the case where the order of the third Fresnel zone plate region 113 is smaller than the order of the first Fresnel zone plate region 111 and is greater than the order of the second Fresnel zone plate region 112, the amount of the third group of driving signals may be equal to the order of the third Fresnel zone plate region 113 (i.e., the voltages applied to the plurality of ring-like electrodes in the third Fresnel zone plate region 113 are different from each other), such that the amount of voltage signals in the third group of driving signals may be smaller than the amount of voltage signals in the first group of driving signals, and is greater than the amount of voltage signals in the second group of driving signals. For example, in the case where the order of the third Fresnel zone plate region 113 is four, for the four ring-like electrodes that are arranged along the direction from the center of the Fresnel zone plate to the edge of the Fresnel zone plate, the applied voltage may respectively be 0V, 1.87V, 2.12V, and 2.53V, but the embodiments of the present disclosure are not limited to this case.

For example, in the case where the order of the third Fresnel zone plate region 113 is equal to the order of the first Fresnel zone plate region 111, the third group of driving signals may be the same as the first group of driving signals (i.e., the amounts of voltage signals included by the third group of driving signals and the first group of driving signals are identical, and the voltage values of corresponding voltage signals are identical); and in the case where the order of the third Fresnel zone plate region 113 is equal to the order of the second Fresnel zone plate region 112, the third group of driving signals may be the same as the second group of driving signals. For example, by allowing the order of the third Fresnel zone plate region 113 to be equal to the order of the first Fresnel zone plate region 111 or the order of the second Fresnel zone plate region 112, and allowing the third group of driving signals to be the same as the first group of driving signals or the second group of driving signals, the size of the Fresnel zone plate formed by the liquid crystal cell can be increased without increasing the complexity of driving.

Figure 9A:
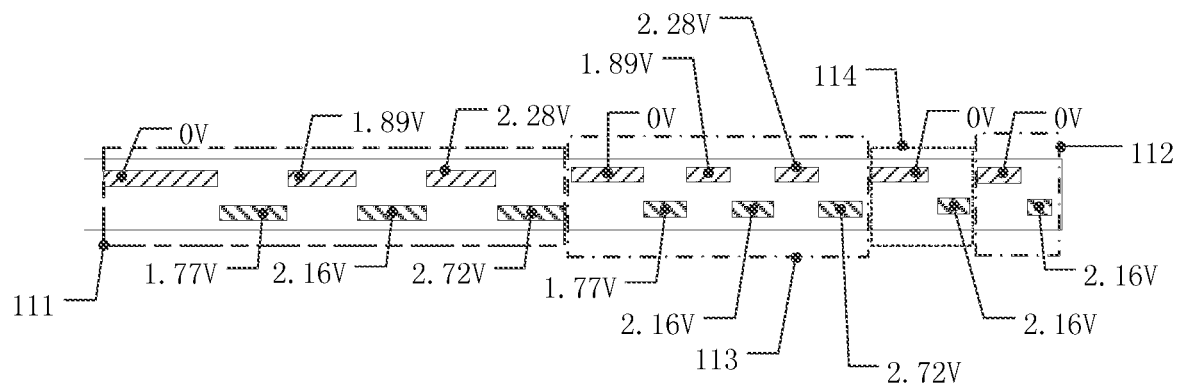
FIG. 9A is a schematic diagram of a method of driving a liquid crystal cell provided by an embodiment of the present disclosure.

For example, as illustrated in FIG. 5, in the case where the liquid crystal cell further comprises the fourth Fresnel zone plate region 114, the order of the third Fresnel zone plate region 113 is equal to the order of the first Fresnel zone plate region 111, and the order of the fourth Fresnel zone plate region 114 is equal to the order of the second Fresnel zone plate region 112, the above-mentioned method further comprises: applying the first group of driving signals to the third Fresnel zone plate region 113 (see FIG. 9A); and applying the second group of driving signals to the fourth Fresnel zone plate region 114 (see FIG. 9A). Here, the fourth Fresnel zone plate region 114 is concentric with the third Fresnel zone plate region 113 and surrounds the third Fresnel zone plate region 113, and the second Fresnel zone plate region 112 surrounds the fourth Fresnel zone plate region 114. For example, by providing the fourth Fresnel zone plate region 114, and allowing the order of the fourth Fresnel zone plate region 114 to be equal to the order of the second Fresnel zone plate region 112, and by applying the second group of driving signals to the fourth Fresnel zone plate region 114, the size of the Fresnel zone plate formed by the liquid crystal cell can be further increased without increasing the complexity of driving.

For example, for the liquid crystal cell as illustrated in FIG. 5, the method further comprises following steps.

Step S210: changing signals that are applied to the first Fresnel zone plate region 111 from the first group of driving signals into a fourth group of driving signals, and changing signals that are applied to the ring-like electrodes in the third Fresnel zone plate region 113 from the first group of driving signals into a fifth group of driving signals, so as to merge the first Fresnel zone plate region 111 and the third Fresnel zone plate region 113 into a first merged Fresnel zone plate region as a whole.

Step S220: changing signals that are applied to the second Fresnel zone plate region 112 from the second group of driving signals into a sixth group of driving signals, and changing signals that are applied to the fourth Fresnel zone plate region 114 from the second group of driving signals into a seventh group of driving signals, so as to merge the second Fresnel zone plate region 112 and the fourth Fresnel zone plate region 114 into a second merged Fresnel zone plate region as a whole. An order of the first merged Fresnel zone plate region is greater than an order of the second merged Fresnel zone plate region.

Figure 9B:
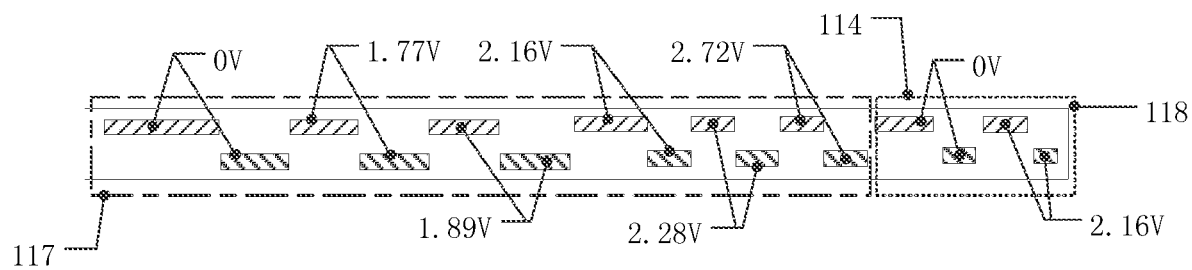
FIG. 9B is a schematic diagram of another method of driving a liquid crystal cell provided by an embodiment of the present disclosure.

For example, as illustrated in FIG. 9B, an amount of voltage signals in the fourth group of driving signals and an amount of voltage signals in the fifth group of driving signals may be equal to half of the amount of voltage signals in the first group of driving signals, and the voltages that are applied to adjacent first ring-like electrode and second ring-like electrode, for example, may be the same. For example, in a case where the first group of driving signals is 0V, 1.77V, 1.89V, 2.16V, 2.28V, and 2.72V, the fourth group of driving signals may be 0V, 1.77V, and 1.89V, and the fifth group of driving signals may be 2.16V, 2.28V, and 2.72V, such that the first Fresnel zone plate region 111 and the third Fresnel zone plate region 113 can be merged into the first merged Fresnel zone plate region as a whole, and the order (for example, may be six) of the first merged Fresnel zone plate region is equal to the order of the original first Fresnel zone plate region 111 and the order of the original third Fresnel zone plate region 113.

For example, as illustrated in FIG. 9B, an amount of voltage signals in the sixth group of driving signals and an amount of voltage signals in the seventh group of driving signals may be equal to half of the second group of driving signals, and the voltages that are applied to adjacent first ring-like electrode and second ring-like electrode, for example, can be the same. For example, in a case where the second group of driving signals are 0V and 2.16V, the sixth group of driving signals may be 0V, and the seventh group of driving signals may be 2.16V, so as to merge the second Fresnel zone plate region 112 and the fourth Fresnel zone plate region 114 into the second merged Fresnel zone plate region as a whole, and the order (for example, may be two) of the second merged Fresnel zone plate region is equal to the order of the original second Fresnel zone plate region 112 and the order of the original fourth Fresnel zone plate region 114. Therefore, the order of the first merged Fresnel zone plate region is greater than the order of the second merged Fresnel zone plate region.

For example, by merging the first Fresnel zone plate region 111 and the third Fresnel zone plate region 113 into the first merged Fresnel zone plate region as a whole, and merging the second Fresnel zone plate region 112 and the fourth Fresnel zone plate region 114 into the second merged Fresnel zone plate region as a whole, widths of steps in the first merged Fresnel zone plate region and the second merged Fresnel zone plate region can be increased, so as to allow the focal length of the Fresnel lens to be increased from f to 2f, that is, the degree of the liquid crystal spectacles including the Fresnel lens can be reduced by half, such that the user still can use the liquid crystal spectacles after the eyesight of the user becomes better, and different users can share the same pair of spectacles. In this method, changing of the structure of the liquid crystal spectacles is unnecessary, and it is only needed to change the applied driving signals, such that the method is easy to implement.

At least one embodiment of the present disclosure provides a liquid crystal cell, a method of driving a liquid crystal cell, and a liquid-crystal-based spectacle lens. By providing the second ring-like electrode region with a relatively smaller number of electrodes, the size of the liquid crystal cell can be increased and/or the focal length of the liquid crystal cell can be reduced while the transmittance is guaranteed, so as to allow the liquid crystal cell to be suitable for fabricating the liquid crystal spectacles.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

It is apparent that the embodiments of the present disclosure may be changed and modified by those skilled in the art without departure from the spirit and scope of the disclosure. If the above-mentioned changes and modifications of the embodiments of the present disclosure belong to the scope of the claims of the present disclosure and its equivalent technologies, the present disclosure is intended to include the above changes and modifications.

What are described above is related to the illustrative embodiments of the disclosure only and not limitative to the scope of the disclosure; the scopes of the disclosure are defined by the accompanying claims.

What is claimed is:

1. A liquid crystal cell, comprising: a ring-like electrode layer, a liquid crystal layer, and an opposite electrode layer,
wherein the liquid crystal layer is between the ring-like electrode layer and the opposite electrode layer;
the ring-like electrode layer comprises a first ring-like electrode region and a second ring-like electrode region, and the second ring-like electrode region is concentric with the first ring-like electrode region and surrounds the first ring-like electrode region;
the first ring-like electrode region is configured to drive corresponding liquid crystal molecules in the liquid crystal layer, so as to form a first Fresnel zone plate region of the liquid crystal cell;
the second ring-like electrode region is configured to drive corresponding liquid crystal molecules in the liquid crystal layer, so as to form a second Fresnel zone plate region of the liquid crystal cell; and
an order of the second Fresnel zone plate region is smaller than an order of the first Fresnel zone plate region,
the liquid crystal cell further comprises a third Fresnel zone plate region,
wherein the third Fresnel zone plate region is concentric with the first Fresnel zone plate region and surrounds the first Fresnel zone plate region;
the second Fresnel zone plate region surrounds the third Fresnel zone plate region; and
an order of the third Fresnel zone plate region is smaller than the order of the first Fresnel zone plate region and is greater than the order of the second Fresnel zone plate region, or
an order of the third Fresnel zone plate region is equal to the order of the first Fresnel zone plate region or the order of the second Fresnel zone plate region;
the liquid crystal cell further comprises a fourth Fresnel zone plate region,
wherein the fourth Fresnel zone plate region is concentric with the third Fresnel zone plate region and surrounds the third Fresnel zone plate region, and the second Fresnel zone plate region surrounds the fourth Fresnel zone plate region; and
the order of the third Fresnel zone plate region is equal to the order of the first Fresnel zone plate region, and an order of the fourth Fresnel zone plate region is equal to the order of the second Fresnel zone plate region,
wherein the ring-like electrode layer comprises a plurality of ring-like electrodes arranged outward from a center of the ring-like electrode layer along a radial direction of the ring-like electrode layer, the ring-like electrode layer further comprises a third ring-like electrode region and a fourth ring-like electrode region,
an amount of ring-like electrodes in the third ring-like electrode region is equal to the order of the third Fresnel zone plate region, and an amount of ring-like electrodes in the fourth ring-like electrode region is equal to the order of the fourth Fresnel zone plate region.

2. The liquid crystal cell according to claim 1, wherein the ring-like electrode layer comprises a plurality of ring-like electrodes arranged outward from a center of the ring-like electrode layer along a radial direction of the ring-like electrode layer; and
an amount of ring-like electrodes in the first ring-like electrode region is greater than an amount of ring-like electrodes in the second ring-like electrode region.

3. The liquid crystal cell according to claim 2, wherein the plurality of ring-like electrodes comprise a plurality of first ring-like electrodes and a plurality of second ring-like electrodes, and
the plurality of first ring-like electrodes and the plurality of second ring-like electrodes are alternately and sequentially arranged outward from the center of the ring-like electrode layer along the radial direction of the ring-like electrode layer.

4. The liquid crystal cell according to claim 3, wherein the ring-like electrode layer comprises a first electrode layer and a second electrode layer that are insulated from each other, and the second electrode layer is closer to the liquid crystal layer as compared to the first electrode layer;
the first electrode layer comprises the plurality of first ring-like electrodes that are sequentially arranged outward from a center of the liquid crystal cell, and the plurality of first ring-like electrodes are concentric and insulated from each other;
the second electrode layer comprises the plurality of second ring-like electrodes that are sequentially arranged outward from the center of the liquid crystal cell, and the plurality of second ring-like electrodes are concentric and insulated from each other; and
at least part of a projection of each of the first ring-like electrodes on the second electrode layer along a direction perpendicular to the second electrode layer is in a gap between corresponding second ring-like electrodes.

5. The liquid crystal cell according to claim 4, wherein a gap between adjacent second ring-like electrodes is completely covered by a projection of a corresponding first ring-like electrode on the second electrode layer.

6. The liquid crystal cell according to claim 5, wherein an edge of the projection of the each of the first ring-like electrodes on the second electrode layer connects with edges of the corresponding second ring-like electrodes.

7. The liquid crystal cell according to claim 3, wherein the first Fresnel zone plate region is in a circular shape and the second Fresnel zone plate region is in a ring shape;
a radius of the first Fresnel zone plate region is greater than a ring width of the second Fresnel zone plate region; and
all distances between adjacent second ring-like electrodes in the first Fresnel zone plate region are identical.

8. The liquid crystal cell according to claim 1, further comprising a first alignment layer and a second alignment layer,
wherein the liquid crystal layer comprises a plurality of liquid crystal molecules;
the first alignment layer is at a side of the ring-like electrode layer close to the liquid crystal layer;
the second alignment layer is at a side of the opposite electrode layer close to the liquid crystal layer; and
the first alignment layer and the second alignment layer are configured to allow an initial orientation of the plurality of liquid crystal molecules to be parallel to the first alignment layer and the second alignment layer.

9. A liquid-crystal-based spectacle lens, comprising a first liquid crystal cell and a second liquid crystal cell that are stacked,
wherein the first liquid crystal cell and the second liquid crystal cell comprise liquid crystal cells each according to claim 1, and the first liquid crystal cell and the second liquid crystal cell have a same structure; and
an orientation direction of the liquid crystal layer in the first liquid crystal cell and an orientation direction of the liquid crystal layer in the second liquid crystal cell are perpendicular to each other in a plane perpendicular to a direction along which the first liquid crystal cell and the second liquid crystal cell are stacked.

10. A method of driving the liquid crystal cell according to claim 1, comprising:
applying a first group of driving signals to ring-like electrodes in the first ring-like electrode region; and
applying a second group of driving signals to ring-like electrodes in the second ring-like electrode region.

11. The method of driving the liquid crystal cell according to claim 10, wherein the first group of driving signals are configured to drive the corresponding liquid crystal molecules in the liquid crystal layer, so as to form the first Fresnel zone plate region of the liquid crystal cell;
the second group of driving signals are configured to drive the corresponding liquid crystal molecules in the liquid crystal layer, so as to form the second Fresnel zone plate region of the liquid crystal cell; and
the order of the second Fresnel zone plate region is smaller than the order of the first Fresnel zone plate region.

12. The method of driving the liquid crystal cell according to claim 11, wherein, in a case where the liquid crystal cell further comprises a third Fresnel zone plate region,
the third Fresnel zone plate region is concentric with the first Fresnel zone plate region and surrounds the first Fresnel zone plate region, and the second Fresnel zone plate region surrounds the third Fresnel zone plate region,
an order of the third Fresnel zone plate region is smaller than the order of the first Fresnel zone plate region and is greater than the order of the second Fresnel zone plate region, or an order of the third Fresnel zone plate region is equal to the order of the first Fresnel zone plate region or the order of the second Fresnel zone plate region, and
the method further comprises:
applying a third group of driving signals to liquid crystal molecules corresponding to the third Fresnel zone plate region.

13. The method of driving the liquid crystal cell according to claim 12, wherein, in a case where the liquid crystal cell further comprises a fourth Fresnel zone plate region,
the fourth Fresnel zone plate region is concentric with the third Fresnel zone plate region and surrounds the third Fresnel zone plate region, and the second Fresnel zone plate region surrounds the fourth Fresnel zone plate region,
the order of the third Fresnel zone plate region is equal to the order of the first Fresnel zone plate region, and an order of the fourth Fresnel zone plate region is equal to the order of the second Fresnel zone plate region, and the method further comprises:
applying the first group of driving signals to the liquid crystal molecules corresponding to the third Fresnel zone plate region; and
applying the second group of driving signals to liquid crystal molecules corresponding to the fourth Fresnel zone plate region.

14. The method of driving the liquid crystal cell according to claim 13, further comprising:
changing signals that are applied to liquid crystal molecules corresponding to the first Fresnel zone plate region from the first group of driving signals into a fourth group of driving signals, and changing signals that are applied to the liquid crystal molecules corresponding to the third Fresnel zone plate region from the first group of driving signals into a fifth group of driving signals, so as to merge the first Fresnel zone plate region and the third Fresnel zone plate region into a first merged Fresnel zone plate region as a whole; and
changing signals that are applied to liquid crystal molecules corresponding to the second Fresnel zone plate region from the second group of driving signals into a sixth group of driving signals, and changing signals that are applied to the liquid crystal molecules corresponding to the fourth Fresnel zone plate region from the second group of driving signals into a seventh group of driving signals, so as to merge the second Fresnel zone plate region and the fourth Fresnel zone plate region into a second merged Fresnel zone plate region as a whole, and an order of the first merged Fresnel zone plate region being greater than an order of the second merged Fresnel zone plate region.

15. The method of driving the liquid crystal cell according to claim 10, wherein voltages that are applied to the ring-like electrodes in the first Fresnel zone plate region are different from each other; and
voltages that are applied to the ring-like electrodes in the second Fresnel zone plate region are different from each other.

16. The liquid crystal cell according to claim 2, wherein the amount of the ring-like electrodes in the first ring-like electrode region is equal to the order of the first Fresnel zone plate region, and the amount of the ring-like electrodes in the second ring-like electrode region is equal to the order of the second Fresnel zone plate region.

17. The liquid crystal cell according to claim 2, wherein widths of the ring-like electrodes, except for a ring-like electrode at a center of a formed Fresnel zone plate, in the first Fresnel zone plate region, are greater than widths of the ring-like electrodes, except for a ring-like electrode that is closest to the center of the formed Fresnel zone plate, in the second Fresnel zone plate region.

* * * * *